United States Patent
Yeung et al.

(10) Patent No.: US 7,923,075 B2
(45) Date of Patent: Apr. 12, 2011

(54) METHODS FOR PREPARING NANOTEXTURED SURFACES AND APPLICATIONS THEREOF

(75) Inventors: King Lun Yeung, Kowloon (HK); Ou Dong, Kowloon (HK); Nan Yao, Kowloon (HK)

(73) Assignee: The Hong Kong University of Science and Technology, Hong Kong (CN)

( * ) Notice: Subject to any disclaimer, the term of this patent is extended or adjusted under 35 U.S.C. 154(b) by 912 days.

(21) Appl. No.: 11/826,691

(22) Filed: Jul. 17, 2007

(65) Prior Publication Data

US 2008/0248216 A1 Oct. 9, 2008

Related U.S. Application Data

(60) Provisional application No. 60/831,194, filed on Jul. 17, 2006.

(51) Int. Cl.
*B05D 3/06* (2006.01)
(52) U.S. Cl. ........ 427/553; 427/557; 427/337; 427/340; 427/341; 977/842
(58) Field of Classification Search .................. 427/553, 427/557, 337, 340, 341; 977/842
See application file for complete search history.

(56) References Cited

U.S. PATENT DOCUMENTS

| | | | |
|---|---|---|---|
| 6,787,198 B2 | 9/2004 | Mukherjee et al. | |
| 2005/0096447 A1 | 5/2005 | Yamagishi et al. | |
| 2005/0131184 A1 | 6/2005 | Yamagishi et al. | |
| 2006/0009354 A1 | 1/2006 | Yeung et al. | |
| 2006/0019028 A1 | 1/2006 | Yeung et al. | |
| 2006/0078681 A1 | 4/2006 | Hieda et al. | |
| 2006/0134556 A1 | 6/2006 | Nealey et al. | |

OTHER PUBLICATIONS

Micheletto et al. A Simple Method for the Production of a Two-Dimensional, Ordered Array of Small Latex Particles. Langmuir. 1995, 11, 3333-3336.
Komarneni, S. Nanophase materials by hydrothermal, microwave-hydrothermal and microwave-solvothermal methods. Current Science. Dec. 25, 2003. vol. 85, No. 12, 1730-1734.
Wang et al. Large-Scale Hexagonal-Patterned Growth of Aligned ZnO Nanorods for Nano-optoelectronics and Nanosensor Arrays. Nano Letters. (2004). vol. 4, No. 3. 423-426.
Guarini et al. Process integration of self-assembled polymer templates into silicon nanofabrication. J. Vac. Sci. Technol. B 20(6), Nov.-Dec. 2002.
Micheletto et al. A Simple Method for the Production of a Two-Dimensional, Ordered Array of Small Latex Particles. Langmuir. 1996, 11, 3333-3336.
Rybczynski et al. Large-scale, 2D arrays of magnetic nanoparticles. Colloids and Surfaces A: Physicochem. Eng. Aspects 219 (2003) 1-6.
Deev et al. Effect of Long-Term Exposure in the Space Environment on the Microstructure of Fibre-Reinforced Polymers. Composites Science and Technology 57(I997) 1391-1401.

(Continued)

*Primary Examiner* — Timothy H Meeks
*Assistant Examiner* — Collette Ripple
(74) *Attorney, Agent, or Firm* — The Nath Law Group; Jerald L. Meyer; Stanley N. Protigal

(57) ABSTRACT

A rapid and inexpensive technique for generating nanotextured surfaces is disclosed. The technique involves the (1) creation of regular, nanometer-sized template by microwave assisted hydro- or solvo-thermal treatment of polymer films coated on surfaces followed by (2) coating of a layer of metal, metal oxides, polymers and inorganic materials. The nanometer-sized polymer template could be removed to create regularly shaped, hollow nanostructures (e.g., nano-bottles, nano-bowls, nano-holes etc.).

20 Claims, 31 Drawing Sheets

OTHER PUBLICATIONS

Kempa et al. Photonic Crystals Based on Periodic Arrays of Aligned Carbon Nanotubes. Nano Letters 2003. vol. 3, No. 1. 13-18.

Park et al. Block Copolymer Lithography: Periodic Arrays of ~1011 Holes in 1 Square Centimeter. Science. vol. 276. May 30, 1997.

Haynes et al. Nanosphere Lithography: A Versatile Nanofabrication Tool for Studies of Size-Dependent Nanoparticle Optics. J. Phys. Chem. B 2001, 105, 5599-5611.

Wang et al. Large-Size Liftable Inverted-Nanobowl Sheets as Reusable Masks for Nanolithiography. Nano Letters. 2005. vol. 5, No. 9. 1784-1788.

Wang et al. Large-Scale Fabrication of Ordered Nanobowl Arrays. Nano Letters. 2004. vol. 4, No. 11. 2223-2226.

Guarini et al. Nanoscale patterning using self-assembled polymers for semiconductor applications. J. Vac. Sci. Technol. B 19(6), Nov./Dec. 2001. 2784-2788.

Hamley, I. Nanostructure fabrication using block copolymers. Nanotechnology 14 (2003) R39-R54.

Sun et al. Direct Growth of Mono- and Multilayer Nanostructured Porous Films on Curved Surfaces and Their Application as Gas Sensors. Adv. Mater. 2005, 17, 2872-2877.

Black et al. Microfabrication of two layer structures of electrically isolated wires using self-assembly to guide the deposition of insulating organic polymer. Sensors and Actuators. 86(2000) 96-102.

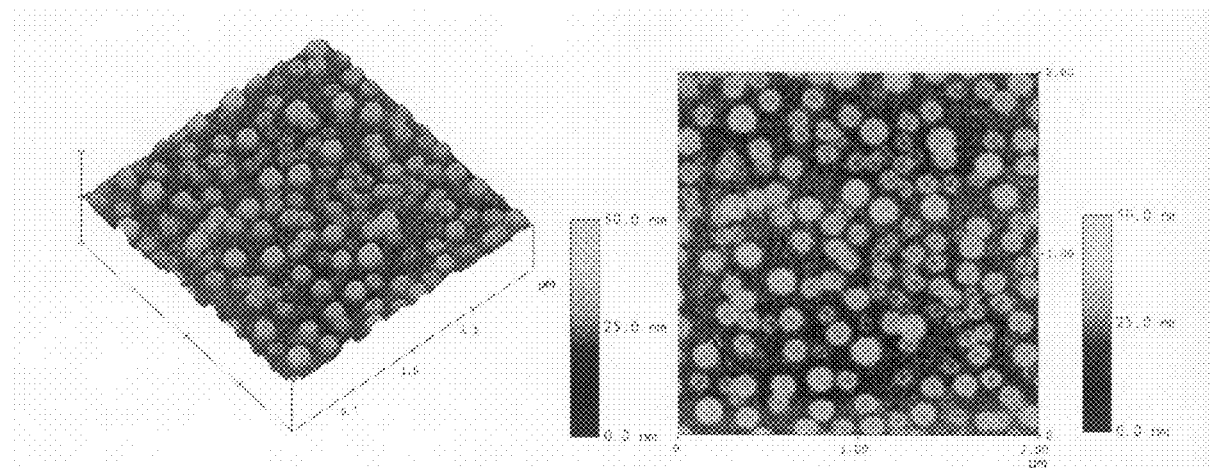
Fig. 18a
Fig. 18b
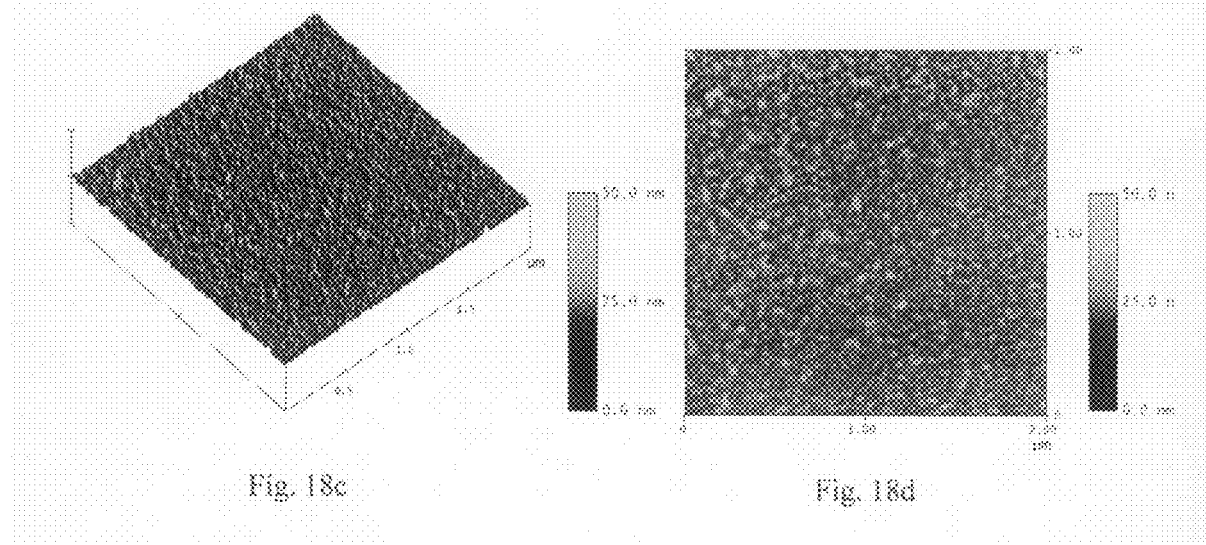
Fig. 18c
Fig. 18d

METHODS FOR PREPARING NANOTEXTURED SURFACES AND APPLICATIONS THEREOF

CROSS-REFERENCE TO RELATED APPLICATIONS

This application claims the benefit of U.S. Provisional Application Ser. No. 60/831,194, filed Jul. 17, 2006 in the name of King Lun Yeung et al. and entitled "Method for Preparing Nanotextured Surfaces and Applications Thereof", said provisional application being hereby incorporated by reference as if fully set forth herein.

FIELD OF THE INVENTION

The present subject matter relates to a method for creating a nanotextured surface using microwave-assisted irradiation. In particular, the present subject matter relates to a rapid and convenient method for creating a nanotextured surface involving transforming a polymer film on a substrate into uniform islands of a regularly shaped, nanometer sized template by microwave-assisted hydro- or solvo-thermal treatments of the polymer films.

BACKGROUND OF THE INVENTION

The fabrications of functional nanoarchitectures with the desired dimensional structure are of great importance because of their unique optical, electrical, magnetic and catalytic properties and have huge potential applications in electronics, sensors, optics, medicines, environments and chemical manufacturings. Current methods use traditional photolithograph, as well as more advanced soft-lithography and microfluidic techniques to shape microstructures from submicron to millimeter length scales. Except for the scanning probe microscope-based nanolithography (i.e., tip induced oxidation, dip-pen, nanografting) and biological-based assembly (i.e., molecular crossing and antibody-antigen recognition mechanisms), most of the nanometer-sized constructions were built via template-assisted and/or self-assembly procedures using molecules, clusters and particles as fundamental building blocks. The common templates used to prepare nanoscaled and nanotextured materials include patterned photoresists, polymer beads and surfactant molecules and the templates employed either top-down lithographic approach or bottom-up, self-assembly procedure.

Techniques for making nanostructured functional materials based on a polymer template have been reported in literature and patent application publications.

The most popular method for making nanostructured functional materials employs block polymer consisting of two or more different polymer chains (or blocks) that can spontaneously self-organize into nanometer-scale domains. The selective processing of one of the polymer chains or blocks using reactive ion etching has been used to produce periodic arrays at nanoscale. This method has been reported in: "Block copolymer Lighography: Periodic Arrays of ~$10^{11}$ holes in a 1 Square Centimeter" Miri Park, et. al, *Science* 276 (1997) pp 1401-1404; "Nanoscale patterning using self-assembled polymer for semiconductor applications", K. W. Guarini, et. al, *J. Vac. Sci. Technolo*. B 19(6) (2001) pp 2784-2788; "Process integration of self-assembled polymer templates into silicon nanofabrication", K. W. Guarini, et. al, *J. Vac. Sci. Technolo*. B 20(6) (2002) pp 2788-2792; "Nanostructure fabrication using block copolymer", I W Hamley, *Nanotechnology* 14 (2003) pp R39-R54.

In addition, U.S. Patent Application Publication No. 2006/0134556 to Paul F. Nealey et al. describes a method for replicating substrate patterns including patterns containing irregular features. This method involves depositing block copolymer materials on a patterned substrate and ordering components in the materials to replicate the pattern. Likewise, U.S. Patent Application Publication No. 2006/0078681 to Hiroyuki Hieda et al. describes a pattern forming method using phase separation structure of self-assembling block copolymer and minimizing variations in pattern. A substrate having groove structure pre-formed thereon, is coated with a solution of the block copolymer comprising at least one block having a mesogen group. The block copolymer is caused to self-assemble in the groove to form block copolymer assemblies, which are regularly arrayed.

In an alternate approach, polymer beads are assembled to form an ordered monolayer and multi-layers on surfaces onto which a deposition can be made. Inorganic oxides with ordered nanoporous structure prepared by this method have been reported in: "A simple Method for the production of a Two-Dimensional, Ordered Arrays of Small Latex Particles", R. Micheletto, et. al, *Langmuir* 11 (1995) pp 3333-3336; "Large-Scale Fabrication of Ordered Nanobowl Arrays", Xu Dong Wang, et. al, *Nano letters* 4 (11) (2004) pp 2223-2226"; "Large-Size Liftable Inverted-Nanobowl Sheets as Reusable Masks for Nanolithography", Xu Dong Wang, et. al, *Nano Letters* 5 (9) (2005) pp 1784-1788"; "Direct Growth of Mono- and Multilayer Nanostructured Porous Films on Curved surfaces and Their Application as Gas Sensors", Fengqiang, Sun, et. al, *Adv. Mater*. 17 (2005) pp 2872-2877".

Besides inorganic oxides, metals, carbon nanotubes, semiconductors and other materials were also prepared. This technology has been reported in: "Nanosphere lithography: A Versatile Nanofabrication Tool for Studies of Size-Dependent Nanoparticle Optics", Christy L., et. al, *J. Phy. Chem*. B 105 (2001) pp 5599-5611; "Large-scale, 2D arrays of magnetic nanopaticles", J. Rybczynski, et. al, *Colloids and Surfaces A: Physicochem. Eng. Aspects* 219 (2003) pp 1-6; "Photonic Crystalls Based on Periodic Arrays of aligned Carbon Nanotubes", K. Kempa, et. al, *Nano letters* 3 (1) (2003) pp 13-18; "Large-scale Hexagonal-Patterned Growth of aligned ZnO Nanorods from Nano-optoelectronics and Nanosensor Arrays", Xu Dong Wang et. al, *Nano letters* 4 (3) (2004) pp 423-426.

The high cost of preparing monodispersed polymer beads, however, made this approach an expensive method. Moreover, it is difficult to obtain regular monolayer coverage for polymer beads smaller than 50 nm.

An approach to use hydrothermal treatment to nanostructured films is described in U.S. Pat. No. 6,787,198 to Shyama P. Mukherjee et al. This patent describes a method involving the hydrothermal treatment of nanostructure films to form high k PMOD™ films for use in applications that are temperature sensitive, such as applications using a polymer based substrate. The patent does not use microwave irradiation.

Although Sridhar Komarneni discloses in *Current Science*, Vol. 85 No. 12, December 2003, that the use of microwave field during hydrothermal and solvothermal conditions dramatically enhances their crystallization rate, oxide materials such as zirconia, titania and various spinel ferrites and metals such as Pt, Pd, Ag, Au, etc. of different sizes and shapes were crystallized using the hydrothermal, microwave-hydrothermal and microwave-solvothermal methods.

Accordingly, there has been a need to develop a cost-effective, rapid and convenient method for creating a nanotextured surface.

SUMMARY OF THE INVENTION

The procedure of fabrication of polymer nanostructure in the present subject matter is prepared in not more than 15 minutes and the cost is very low. Further, the method of the present subject matter can be applied to semiconductor materials used on electronic devices, LCD and lighting; biomolecule immobilization, molecular storage and delivery for application in medicine, biotechnology, life-sciences, personal care products and cosmetics; surface coatings and protections; nanostructured magnetic devices for data storage and retrieval; and germicidal materials and coatings.

Accordingly, in one aspect of the present subject matter, a method for creating a nanotextured surface is provided, which comprises transforming a polymer film on a substrate into uniform islands of a regularly shaped, nanometer sized template by microwave irradiation. The microwave irradiation in the method is a microwave-assisted hydro- or solvothermal treatment.

In another aspect of the present subject matter, a method for creating a nanotextured surface is provided which comprises (a) providing a polymer film on a substrate; (b) transforming the polymer film into uniform islands of a regularly shaped, nanometer sized template by microwave irradiation, and (c) depositing materials onto the template. The microwave irradiation is a microwave-assisted hydro- or solvo-treatment achieved in the presence of a solvent, selected from the group consisting of water, alcohol, ketone and mixtures thereof.

Under microwave irradiation and heating, the polymer film rapidly transformed into uniform islands of nanometer-sized polymer islands. Polymethyl methacrylic (PMMA), polystyrene-polybutadiene-polystyrene (SBS) and SU-8 photoresist films are irradiated with microwave in water to form nanotextured surfaces comprising regular, nanometer-sized polymer islands. A thin coating can be deposited by either physical or chemical deposition methods, thereby creating a nanotextured surface made of desired materials.

In another aspect of the present subject matter, the method further comprises removing the polymer template to create a regularly shaped, hollow nanostructure. The nanostructures include without limitation nano-bottles, nano-bowls, nano-rings and nano-holes.

Nano-bottles are hollow semi-spheres with a tiny nanometer-sized hole for mouth. $SiO_2$ and $TiO_2$ nano-bottles are prepared by spin-coating a thin layer of $SiO_2$ or $TiO_2$ sol onto a PMMA nanostructured pattern followed by removal of the polymer by ozone oxidation or air calcination. The methodology is not limited to the use of $SiO_2$ or $TiO_2$ and the present disclosure contemplates the use of metals, metal oxides, semiconductor materials, carbon and other polymers within the methodology. The bottle mouth is created by an eruption caused by the gasification of the polymer.

Nano-bowls are obtained by chemical etching of the nano-bottles to create a larger opening. $SiO_2$ and $TiO_2$ nano-bottles are etched with acid or base etchants.

Nano-rings are prepared by removal of the polymer template by oxygen plasma at 473 K. $SiO_2$ or $TiO_2$ nano-rings are created during the oxygen plasma treatment.

Thin films with nanoholes are obtained by depositing a layer thickness similar or slightly thicker than the height of the polymer template. $TiO_2$ film with regular nanometer-sized holes is made by this procedure after annealing the film at 933 K.

The nano-bottle, nano-bowl, nano-ring and nano-hole structures can be used as a template for patterning the underlying substrate. Silicon with regular nanometer-sized holes is prepared using a two-step etching of $SiO_2$ nano-bottles deposited on silicon serving as pattern mask. The hollow structures are also useful as a template for the deposition and growth of a different material, for example, electroplating of metal within the hollow volume, deposition of polymer materials, carbon nanotubes (CNT) and so forth.

BRIEF DESCRIPTION OF THE DRAWINGS

FIG. 18(a), (b), (c) and (d) show TiO$_2$ surface structure with and without nanotextured PMMA as template according to one embodiment of the present subject matter, where (a) and (b) show the nanotextured TiO$_2$ with hollow, nano-bottle features obtained after air calcination at 723 K using nano-textured PMMA pattern as template, (c) and (d) show a similar TiO$_2$ film surface coated directly on the silicon wafer.

DETAILED DESCRIPTION OF THE INVENTION

Figure 1:
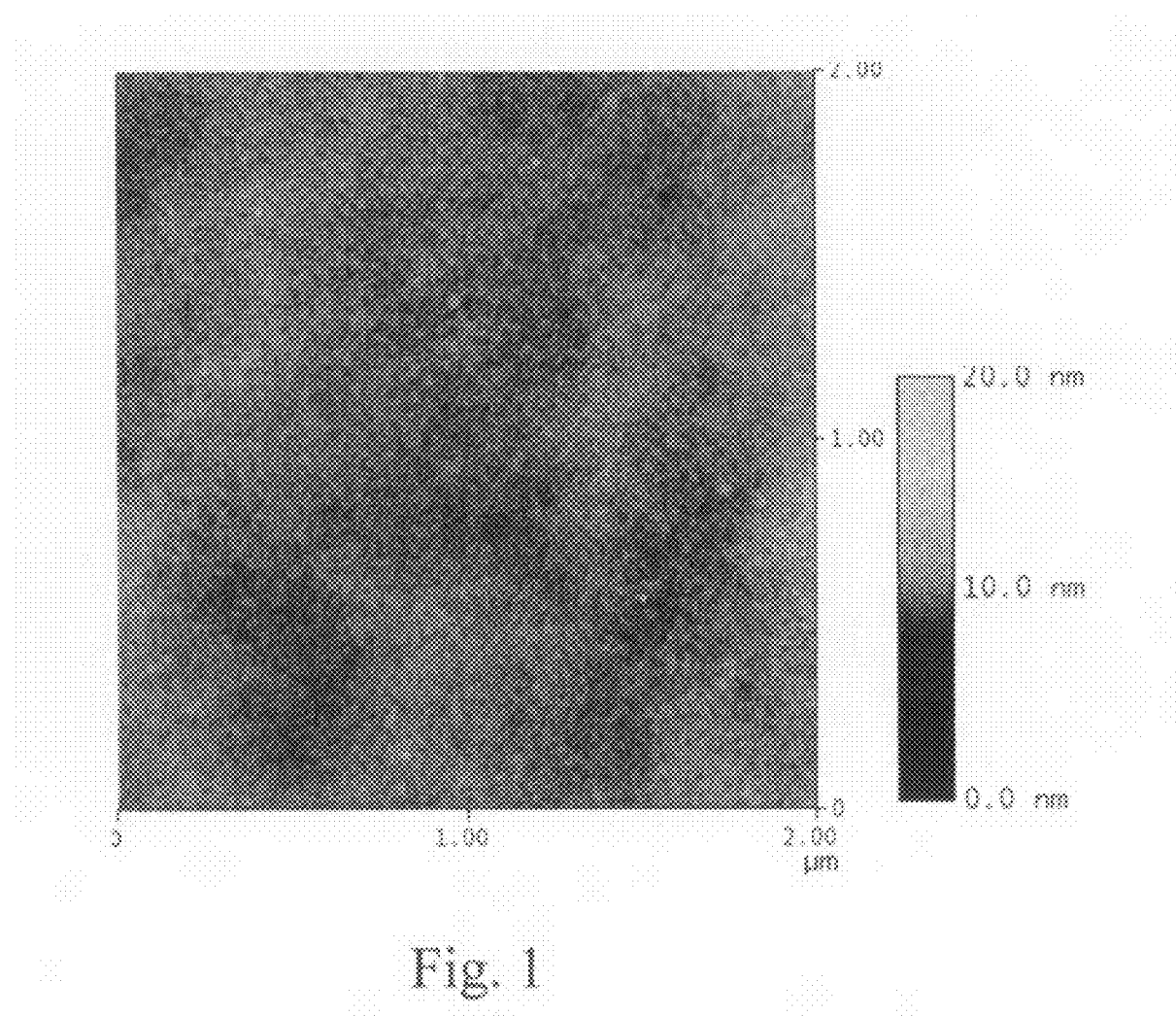
FIG. 1 is an Atomic Force Microwave (AFM) image of PMMA thin film spin-coated on a clean silicon wafer before microwave treatment.

Reference will not be made in detail to specific step by step embodiments of the present subject matter. Examples of the specific embodiments are illustrated in the accompanying drawings. While the subject matter will be described in conjunction with these specific embodiments, it will be understood that it is not intended to limit the subject matter to such specific embodiments. On the contrary, it is intended to cover alternatives, modifications, and equivalents as may be included within the spirit and scope of the subject matter. In the following description, numerous specific details are set forth in order to provide a thorough understanding of the present subject matter. The present subject matter may be practiced without some or all of these specific details. In other instances, well known process operations have not been described in detail in order not to unnecessarily obscure the present subject matter.

The methods of the present subject matter result in nanotextured surfaces that exhibit many advantages. These advantages include the use as a mask for other nanostructures. The methods also change the surface properties and are used to manipulate the properties for better wetting, adhesion and roughness.

1. Preparation of Nanometer-Sized Polymer Template

In one aspect, the present subject matter provides a method for creating a nanotextured surface comprising transforming a polymer film on a substrate into uniform islands of regularly shaped, nanometer-sized polymers by microwave assisted hydro- or solvo-thermal treatments. The method involves (1) providing a polymer film on a substrate by deposition; and (2) transforming the polymer film into uniform islands of a regularly shaped, nanometer sized polymer template by microwave irradiation in the presence of a solvent, preferably water, alcohol, ketone or a mixture thereof. The film thickness is controlled by the coating process; and the microwave radiation dosage is adjusted by its irradiation power and time. A method of providing a polymer film on a substrate is accomplished by deposition using spin-coating.

Spin-Coating of a Polymer Film on a Substrate

A clean substrate, preferably a silicon wafer, is used as a substrate on which a polymer film is deposited. A silicon wafer is cut into small pieces such as, for example, 1×1 cm pieces. The diced wafers are ultrasonicated and cleaned in a solution at a proper temperature for the wafers, and then, rinsed in water and dried.

The polymer to be used may be any polymer without any particular limitation so long as it can be deposited to a substrate, preferably a silicon wafer and be transformed into uniform islands of regularly shaped, nanometer sized template by microwave irradiation. Non-limiting examples of usable polymer include a thermoplastic polymer such as PMMA, a block polymer such as SBS and a photoresist such as SU-8. A thermoplastic PMMA, a block polymer SBS and SU-8 photoresist are preferred for the present subject matter. In addition, resins are useful in this present methodology.

The polymer can be deposited on the silicon wafer by a conventional method, preferably by spin-coating method. PMMA with different molecular weights can be dissolved in a proper solvent, for example, such as chlorobenzene and spin-coated on a flat substrate using a proper device such as Speciality coating system, Inc., Model, P-6204, at different rotation speeds to obtain uniform PMMA film coatings of known thicknesses. The PMMA concentration and rotation speed controls the thickness of the spin coated films. Similarly, SBS with different molecular weights are dissolved in toluene and spin-coated on a flat substrate at different rotation speeds to obtain uniform SBS films coating of known thicknesses. SBS concentration and rotation speed controls the thickness of the spin coated films.

The spin-coated polymer films are outgassed at room temperature to remove the solvent used. The thickness of the film is determined by a conventional method and Ellipsometric Thin Film Thickness Measurement System (L116C, Gaertner) is used in the present subject matter. The spin-coated polymer films obtained are imaged using AFM (Digital Instruments, Nanoscope IIIa). FIG. 1 shows an AFM picture of a PMMA film spin-coated on a silicon wafer.

Microwave Assisted Irradiation of the Polymer Film

The second step of the method according the present subject matter involves transforming the polymer film into uniform islands of a regularly shaped, nanometer sized polymer template by microwave irradiation in the presence of a solvent.

The microwave irradiation is preferably microwave-assisted hydro- or solvo-thermal treatment. Microwave-assisted hydro- or solvo-thermal methods are low temperature treatments for the preparation of nanophase materials of different sizes and shapes. These methods save energy and are environmentally benign because the reactions take place in closed system conditions. The nanophase materials can be produced in either a batch or continuous process using the above methods. Microwave-assisted hydro- or solvo-thermal treatments, where the advantages of both microwave and hydro- or solvo-thermal methods are being made use of, may be carried out using a MARS-5 acid digestion system where reactants are treated in Teflon liners. Both temperature (maximum temperature of 240° C.) and/or pressure (maximum pressure of 350 psi) are precisely controlled with this system. The MARS 5 system uses 2.45 GHz frequency and has a maximum power of 1200 W. The power of this unit can be controlled from 0 to 100%.

Under microwave irradiation and heating, the polymer film is rapidly transformed into uniform islands of nanometer-sized polymer islands. Several parameters affect the size and shape of the polymer islands. These includes (a) nature of the polymer materials (i.e., chemical composition, molecular weight, purity) and its (b) glass transition and (c) melting point temperatures as well as its (d) adhesion strength on the substrate and (e) interactions with the solvent(s). For a fixed set of polymer, solvent(s) and substrate, the size of the polymer islands is directly dependent on (f) film thickness, (g) microwave irradiation energy and (h) irradiation time.

In one embodiment of the present subject matter, the spin-coated polymer film, preferably with a molecular weight of 25,000, is outgassed to remove the solvent. The outgassed sample is placed in a Teflon vessel and a solvent(s) such as water, alcohol, ketone or a mixture thereof is added. The vessel is irradiated with microwave radiation at an optimum dosage including irradiation power and time.

PMMA film, SBS film and SU-8 photoresist film are preferably irradiated with microwave in water to form nanotextured surfaces comprising regular, nanometer-sized polymer islands. For a PMMA film, the microwave treatment is preferably at a microwave power of 20-200 W and an irradiation time of 5 minutes to 2 h. For an SBS film and an SU-8 photoresist film, the microwave treatment is preferably at a microwave power of 20-200 W and an irradiation time of 5 minutes to 1 h.

After the irradiation, the vessel is cooled and the polymer film formed on the surface of the substrate is rinsed and dried. The film morphology of the sample is imaged using an AFM. Independent analysis is also made using a scanning electromicroscopy (SEM, JEOL 6700F).

Figure 14A:
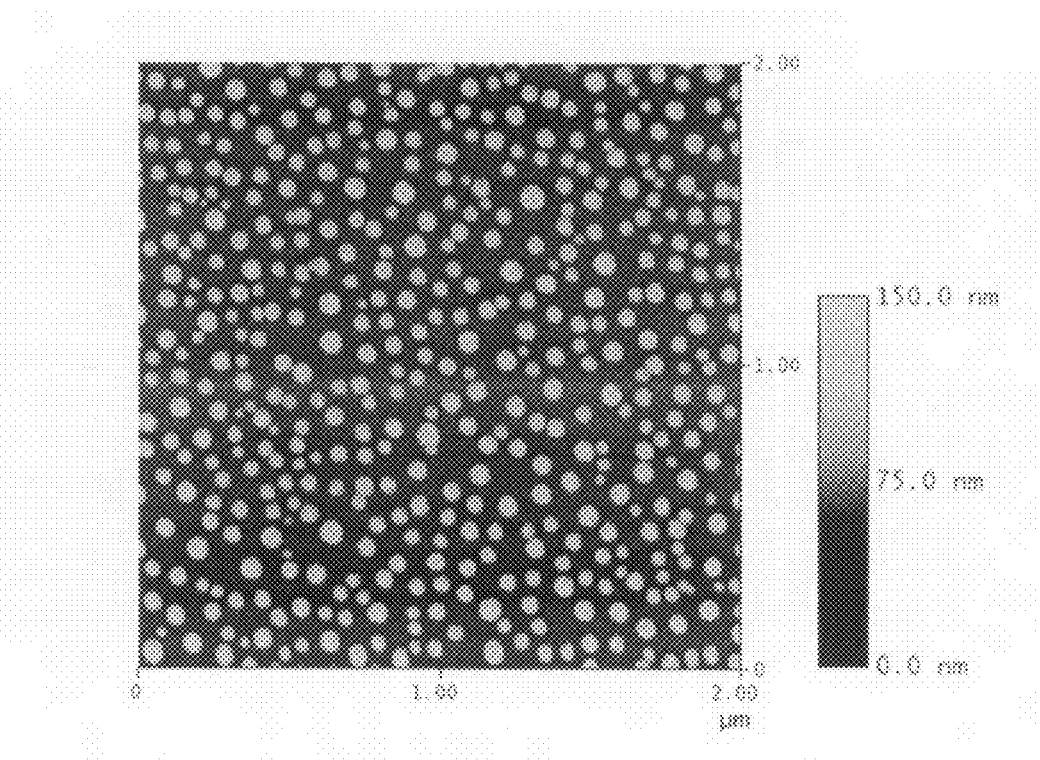
FIGS. 14(a) and (b) show the preparation of $TiO_2$ nanotextured surface according to one embodiment of the present subject matter, where (a) shows the PMMA nanostructure pattern before $TiO_2$ coating and (b) shows the surface structure after spin-coating a thin $TiO_2$ film on the pattern.

AFM pictures taken after the irradiation show that regularly nanometer-sized polymer islands are uniformly distributed over the entire surface. In one embodiment of the present subject matter, a PMMA coated silicon surface having the polymer islands uniformly distributed over the entire surface was obtained after the microwave irradiation treatment (see FIG. 14(a) according to Example 17). The size of the polymer islands may be adjusted from as small as 10 nm to as big as 200 nm by adjusting the film thickness and microwave irradiation.

2. Preparation of Nanotextured Surface

In another aspect of the present subject matter, a method for creating a nanotextured surface comprises (a) providing a polymer film on a substrate; (b) transforming the polymer film into uniform islands of a regularly shaped, nanometer-sized template by microwave irradiation; and (c) depositing materials on the template. Materials that are useful for deposition or the template include materials selected from the group consisting of molecules, clusters and particles of metal, inorganic oxides, semiconductor and polymers. The materials are deposited onto the regularly shaped, nanometer-sized polymer islands prepared by microwave irradiation of deposited polymer films. Nanotextured surfaces are prepared from the deposited materials.

Colloidal $TiO_2$ or $SiO_2$ sol can be deposited onto the nanotextured polymer surface by spin coating. The thickness of the deposited $TiO_2$ or $SiO_2$ depends on the sol concentration and rotation speed. The titanium dioxide sol is obtained by hydrolysis of titanium isopropoxide in water-alcohol solution followed by peptization with acid. The silicon dioxide sol is obtained by hydrolysis of tetraethyl orthosilicate in water-alcohol solution followed by peptization with acid under reflex. Each sol preparation is conducted in nitrogen atmosphere to prevent uncontrolled precipitation of titanium oxide or silicon oxide. Further, the sol is centrifuged to remove coarse particles.

Figure 14B:
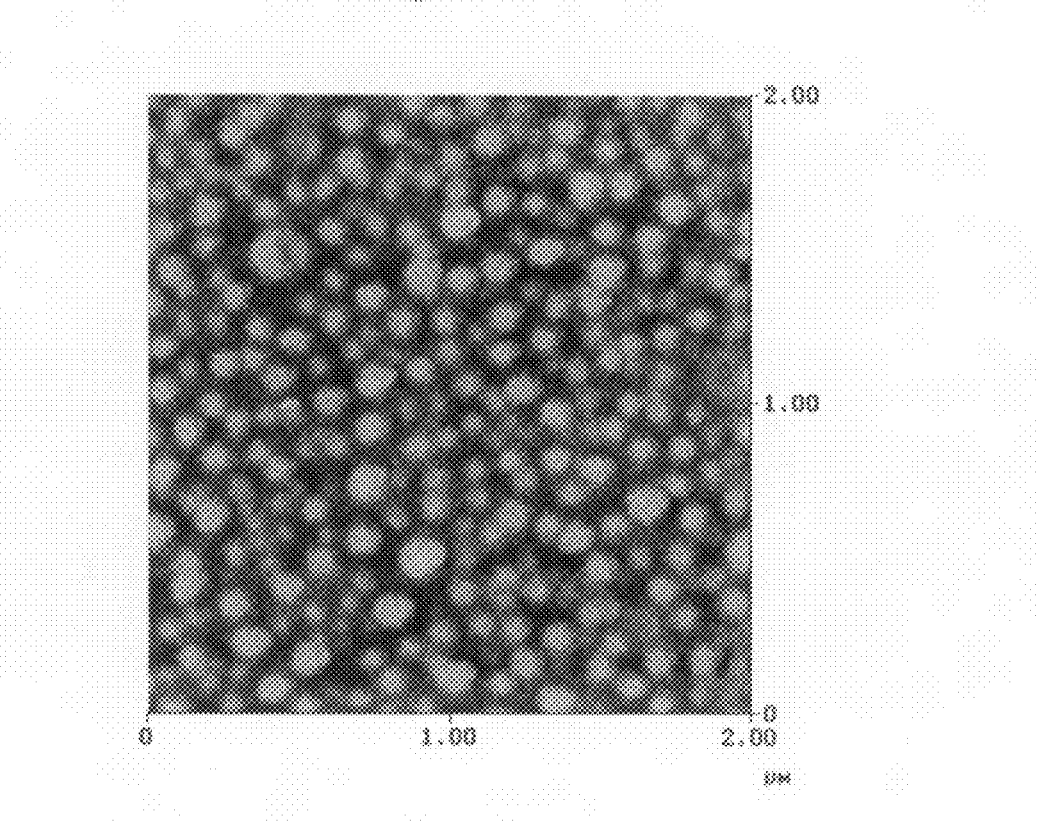
Figure 15A:
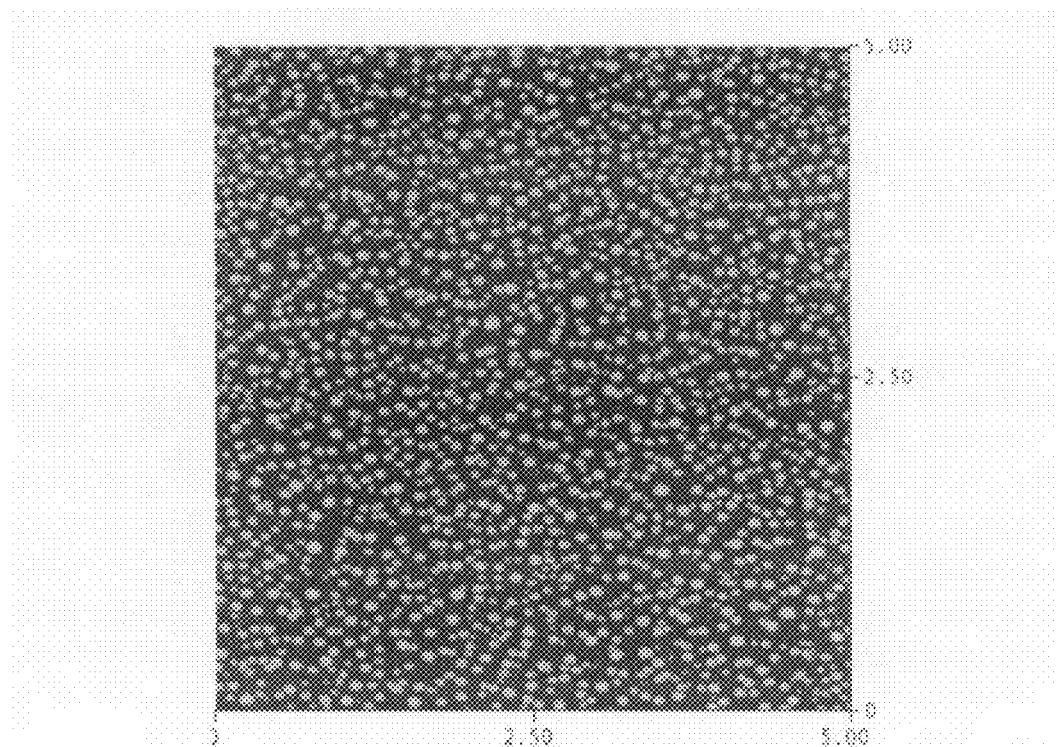
FIGS. 15(a) and (b) show the preparation of $SiO_2$ nanotextured surface according to one embodiment of the present subject matter, where (a) shows the PMMA nanostructure pattern before $SiO_2$ coating and (b) shows the surface structure after spin-coating a thin $SiO_2$ film on the pattern.
Figure 15B:
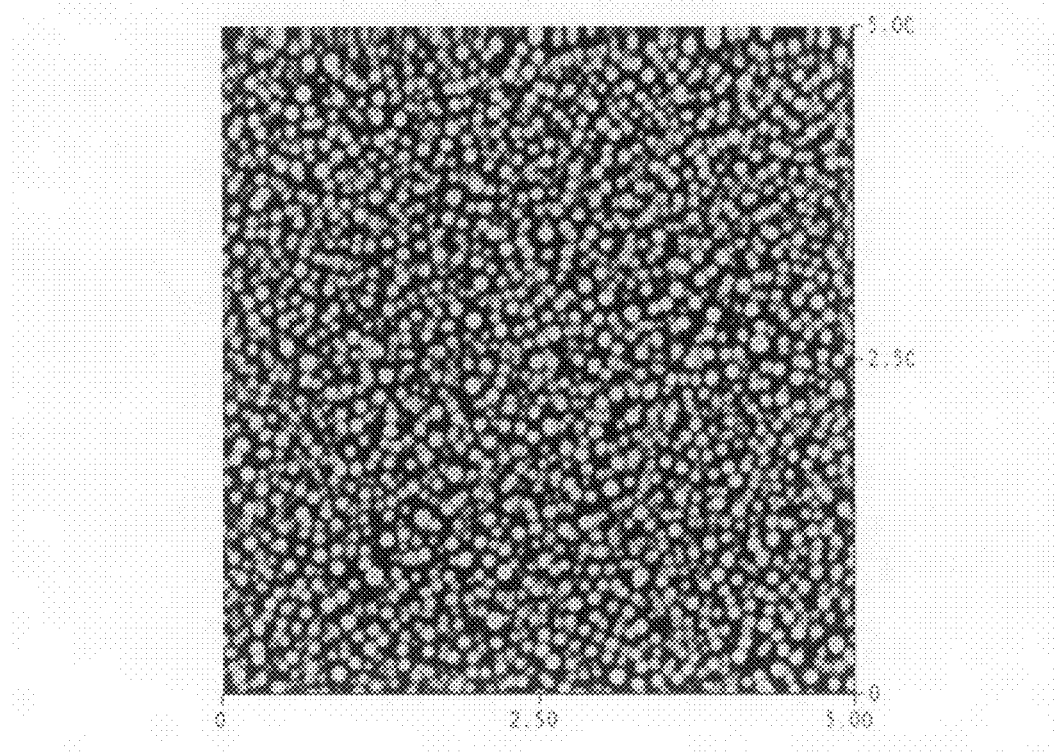

Spin-coating a dilute $TiO_2$ or $SiO_2$ sol at high rotation speed coats the polymers with a thin layer of $TiO_2$ or $SiO_2$ as shown in FIG. 14(b) and FIG. 15(b). X-ray photoelectron spectroscopy (XPS, Physical Electronics PHI 5600) may be used to determine the surface chemical composition. The sample is mounted on a holder and placed in the XPS chamber. The sample is outgassed at ultrahigh vacuum and irradiated with monochromatic AlKα X-ray. XPS analysis indicates that spin coating uniformly coated $TiO_2$ or $SiO_2$ on the entire surface of the sample.

3. Preparation of Hollow Nanostructure

In another aspect, the present subject matter provides a method for creating a nanotextured surface further comprising the step of removing the polymer template to create a regularly shaped, hollow nanostructure. Hollow nanostructures are obtained upon removal of the polymer template after the deposition of metal, inorganic oxides, semiconductor and polymer films on the regularly shaped, nanometer-sized polymer islands prepared by microwave irradiation of deposited polymer films. The regularly shaped, hollow nanostructure may be any of nano-bottles, nano-bowls, nano-rings and nano-holes.

Nano-bottles are hollow semi-spheres with a tiny nanometer-sized hole for mouth. $SiO_2$ or $TiO_2$ nano-bottles are prepared by spin-coating a thin layer of $SiO_2$ or $TiO_2$ sol onto a PMMA nanostructured pattern followed by removal of the polymer by ozone oxidation at 473 K or air calcination at 723 K. The bottle mouth is created by an eruption caused by the gasification of the polymer.

A thin layer of $TiO_2$ or $SiO_2$ film may be coated onto the nanotextured polymer surface by spin coating from a dilute colloidal $TiO_2$ or $SiO_2$ sol, preferably 0.05 mol/L $TiO_2$ or $SiO_2$ to prepare a nanotextured $SiO_2$ surface with nano-bottles. Likewise, a thicker lay of $SiO_2$ film may be coated onto the nanotextured polymer surface by spin coating from a colloidal $TiO_2$ or $SiO_2$ sol, preferably 0.25 mol/L $TiO_2$ or $SiO_2$ sol to prepare a thicker nanotextured $SiO_2$ surface with nano-bottles. The $TiO_2$ or $SiO_2$ shell obtained by the thicker layer is thicker as the spin-coated $TiO_2$ or $SiO_2$ layer is thicker. In either case, the polymer film is removed by a gas phase oxidation and a uniform $TiO_2$ or $SiO_2$ coverage is obtained.

Figures 16A, 16B:
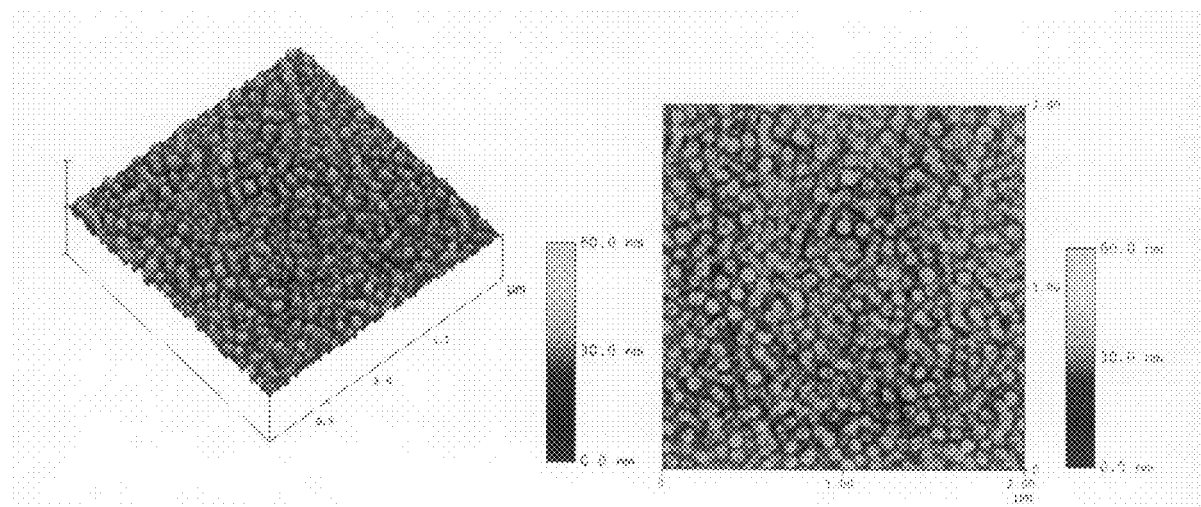
FIG. 16(a), (b), (c) and (d) show $TiO_2$ surface structure with and without nanotextured PMMA template according to one embodiment of the present subject matter, where (a) and (b) show the nanotextured $TiO_2$ with hollow, nano-bottle features obtained after ozone treatment at 473K using nanotextured PMMA pattern as template, (c) and (d) show a similar $TiO_2$ film surface coated directly on the silicon wafer.
Figure 19A:
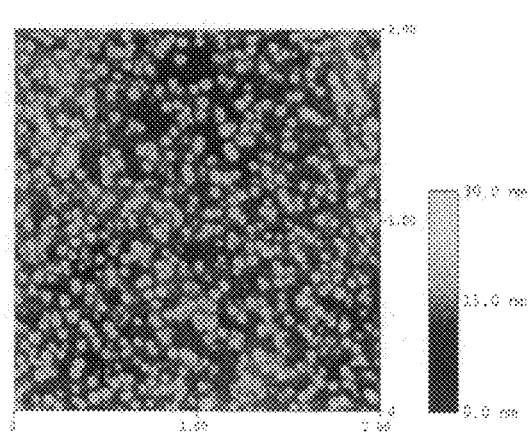
FIGS. 19(a) and (b) relate to Example 21 and show the nanotextured SiO$_2$ with hollow, nano-bottle features with a thinner shell after ozone treatment at 423 K.
Figures 20A, 20B:
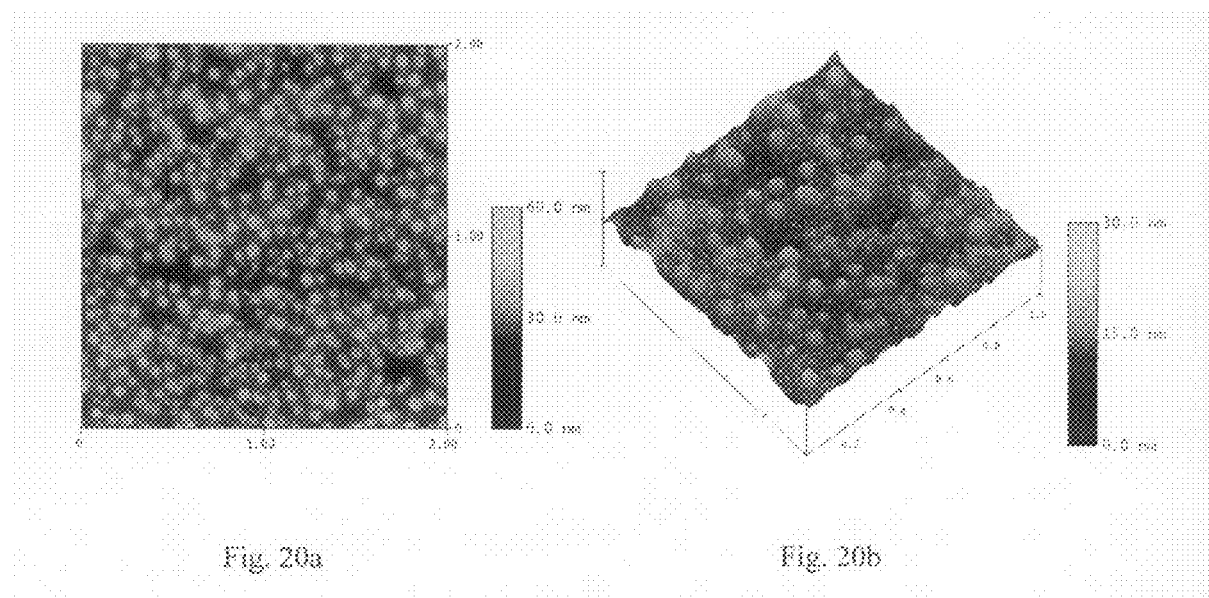
FIGS. 20(a) and (b) relate to Example 22 and show the nanotextured SiO$_2$ with hollow, nano-bottle features with a thicker shell after ozone treatment at 423 K.
Figures 21A, 21B:
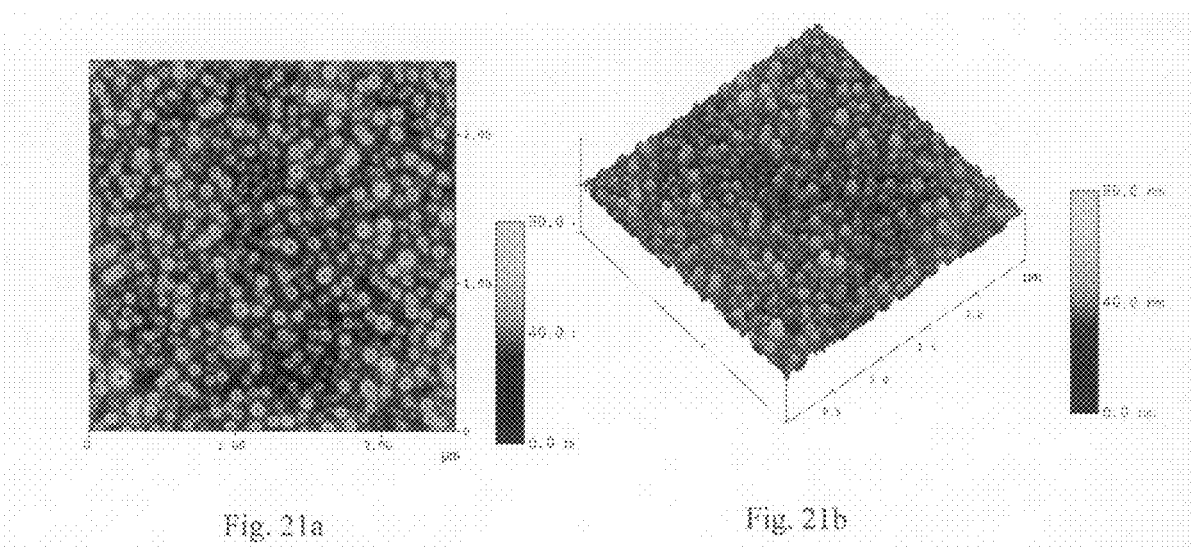
FIGS. 21(a) and (b) relate to Example 22 and show the nanotextured SiO$_2$ with hollow, nano-bottle features with a thicker shell after air calcination at 723 K.

Any conventional method may be used for the removal of the polymer film. Ozone oxidation, oxygen plasma or calcination is preferably used for the present subject matter. The sample may be placed under 250 sccm of 100 g/m³ $O_3$ in $O_2$ gas mixture at 473K to 723 K. The sample is then imaged using AFM to image the film morphology. FIGS. 16(a) and (b) and FIGS. 18(a) and (b) show a $TiO_2$ nanotextured surface that consists of nano-bottle features, i.e., a semi-sphere with a narrow hole at the top; and FIGS. 19(a) and (b), FIGS. 20(a) and (b) and FIGS. 21(a) and (b) show $SiO_2$ nanotextured surface that comprises nano-bottle features. It can be seen from the figures that the nano-bottles have uniform sizes and cover the entire area of the sample.

Figure 22:
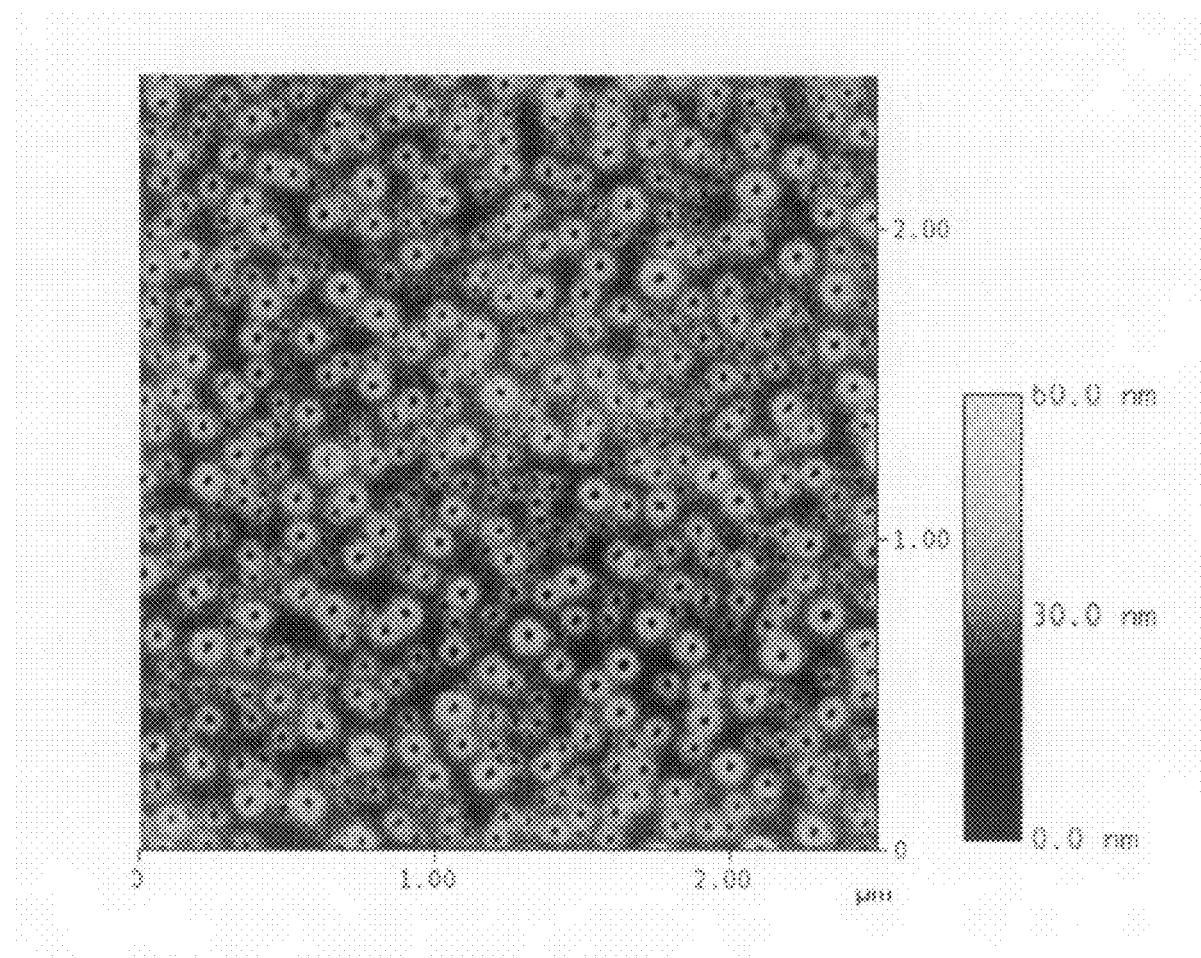
FIG. 22 shows the nanotextured SiO$_2$ with hollow, nano-bowl features with a mouth diameter of 34 nm according to one embodiment of the present subject matter.
Figure 23:
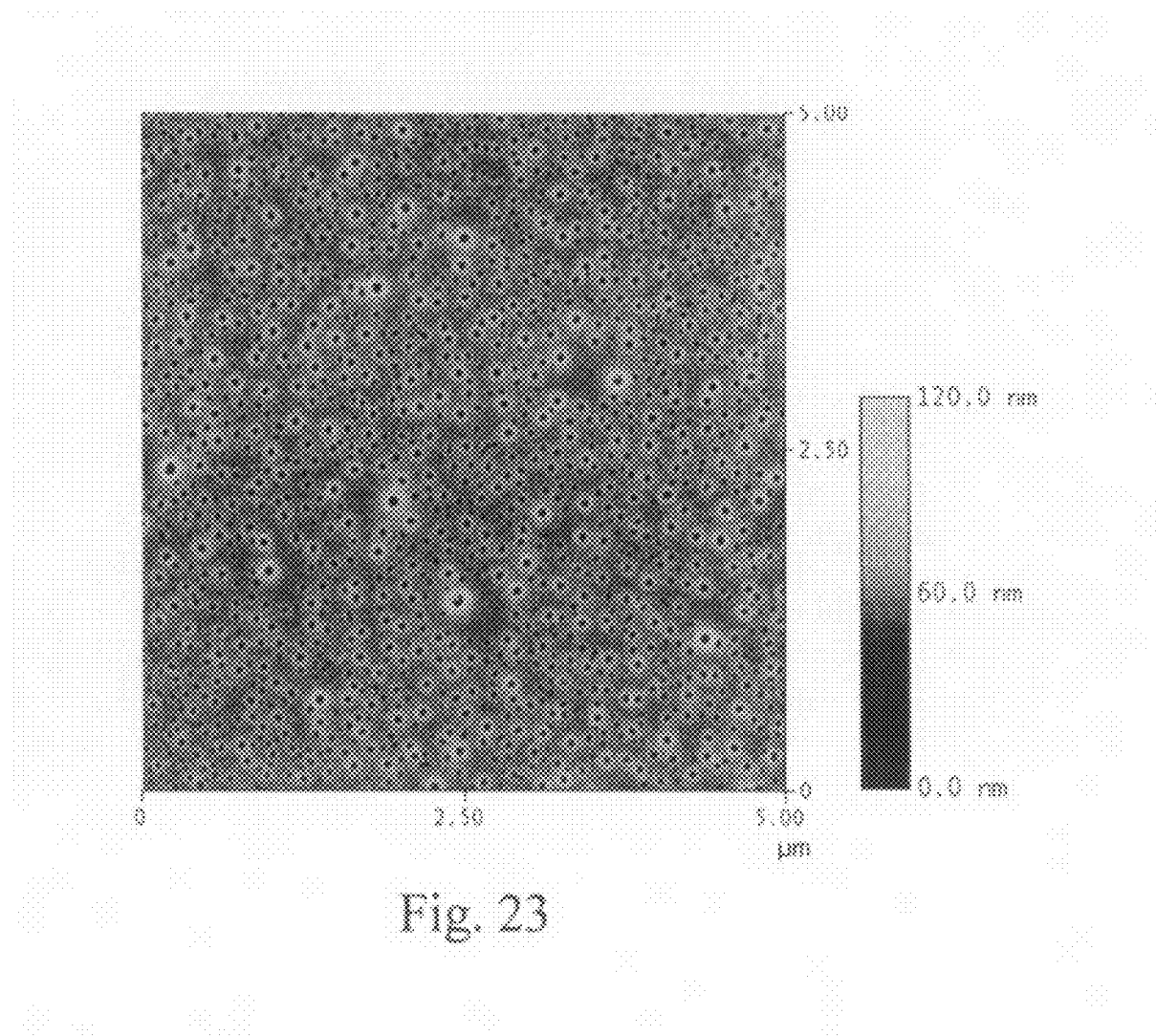
FIG. 23 shows the nanotextured SiO$_2$ with hollow, nano-bowl features with a mouth diameter of 87 nm according to one embodiment of the present subject matter.

Nano-bowls are obtained by chemical etching of the nano-bottles to create a larger opening. $SiO_2$ or $TiO_2$ nano-bottles may be etched with acid or base etchants, turning the nano-bottles into nano-bowls. The size of the opening is controlled by the etching time. The sample is imaged using AFM (Digital Instruments, Nanoscope IIIa) and X-ray photoelectron spectroscopy (XPS, Physical Electronics PHI 5600) is used to determine the surface chemical composition. FIGS. 21, 22 and 23 show, respectively, $SiO_2$ nano-bottles with a different bottle mouth from 16 nm to 87 nm, obtained under different etching time of from 0 to 170 minutes.

Nano-rings or nano-corrals are prepared by removal of the polymer template by oxygen plasma at 473 K. $SiO_2$ or $TiO_2$ nano-rings are created during the oxygen plasma treatment step. The sample is imaged using AFM (Digital Instruments, Nanoscope IIIa) and X-ray photoelectron spectroscopy (XPS, Physical Electronics PHI 5600) is used to determine the surface chemical composition.

Figure 25A:
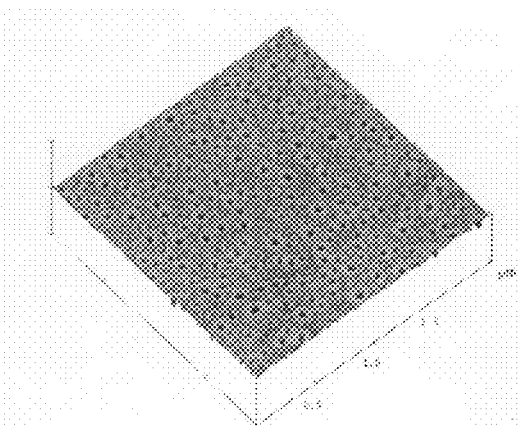
FIG. 25(a), (b), (c) and (d) show TiO$_2$ surface structure with and without nanotextured PMMA as template according to one embodiment of the present subject matter, where (a) and (b) show the TiO$_2$ film with nano-hole features obtained after air calcination at 933 K using nanotextured PMMA pattern as template, (c) and (d) show a similar TiO$_2$ film surface coated directly on the silicon wafer.
Figure 25B:
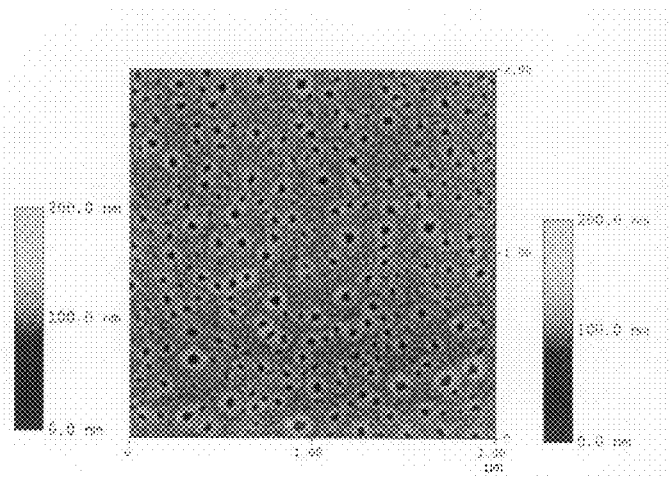
Figure 25C:
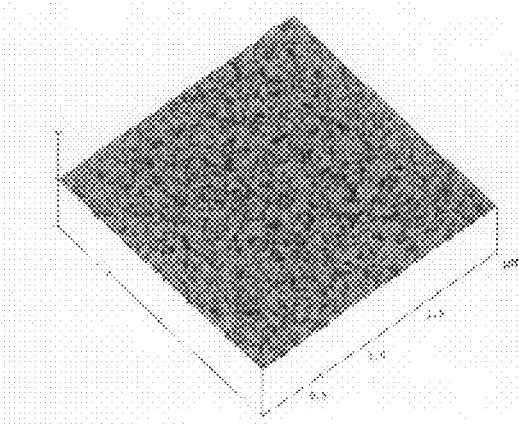
Figure 25D:
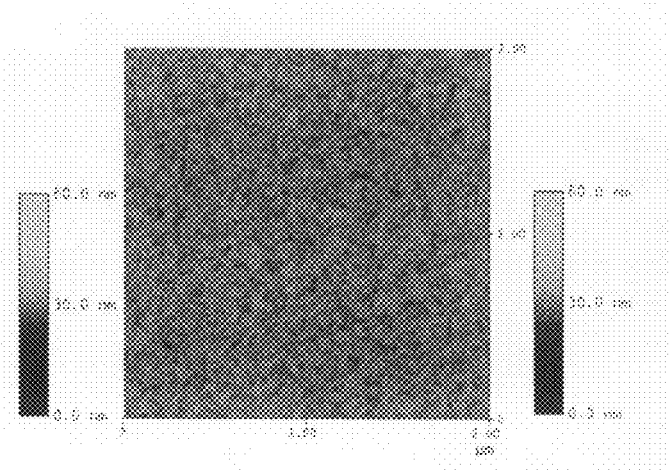

Thin films with nanoholes are obtained by depositing a layer with thickness similar or slightly thicker than the height of the polymer template. $TiO_2$ film with regular nanometer-sized holes is made by this procedure after annealing the film at 933 K. A shorter time has proven effective, but a longer time is preferably used to anneal the film. FIGS. 25(a) and (b) show a $TiO_2$ film with nano-holes and FIGS. 25(c) and (d) show the surface feature of a similarly prepared $TiO_2$ film spin-coated on silicon for comparison. It can be seen from the figures that the nano-holes have uniform sizes and cover the entire area of the sample. From the comparison, it is clear that the nano-holes are the result of the preparation procedure described in this disclosure.

Figure 26A:
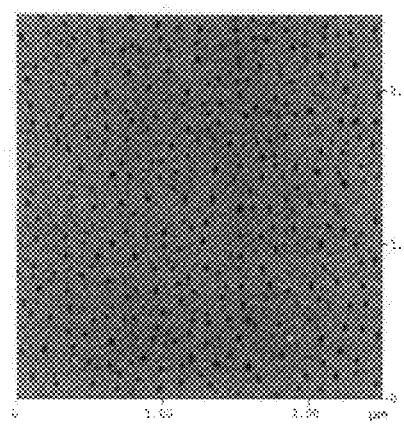
FIG. 26 shows Si nano-holes with diameter of 20 nm was obtained after two-step etching SiO$_2$ nano-bottles in KOH solutions according to one embodiment of the present subject matter.
Figure 26B:
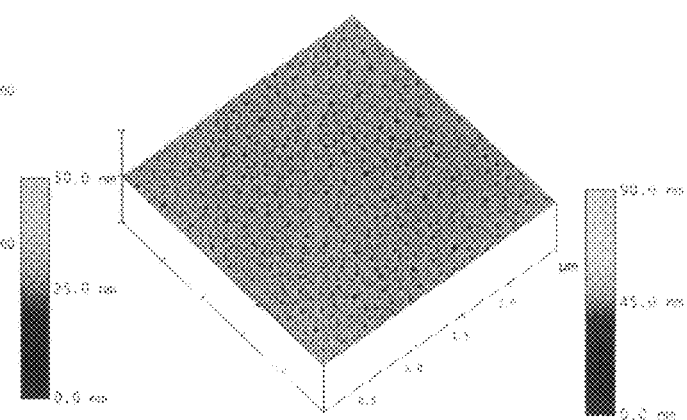

The nano-bottle, nano-bowl, nano-ring and nano-hole structures may be used as a template for patterning the underlying substrate. Silicon with regular nanometer-sized holes is prepared using a two-step etching of $SiO_2$ nano-bottles deposited on a silicon serving as pattern mask with acid or base, to enlarge the opening mouth of the nano-bottles and etch the silicon beneath. FIG. 26 shows a silicon sample uniformly etched with 20 nm nano-holes.

Figure 27:
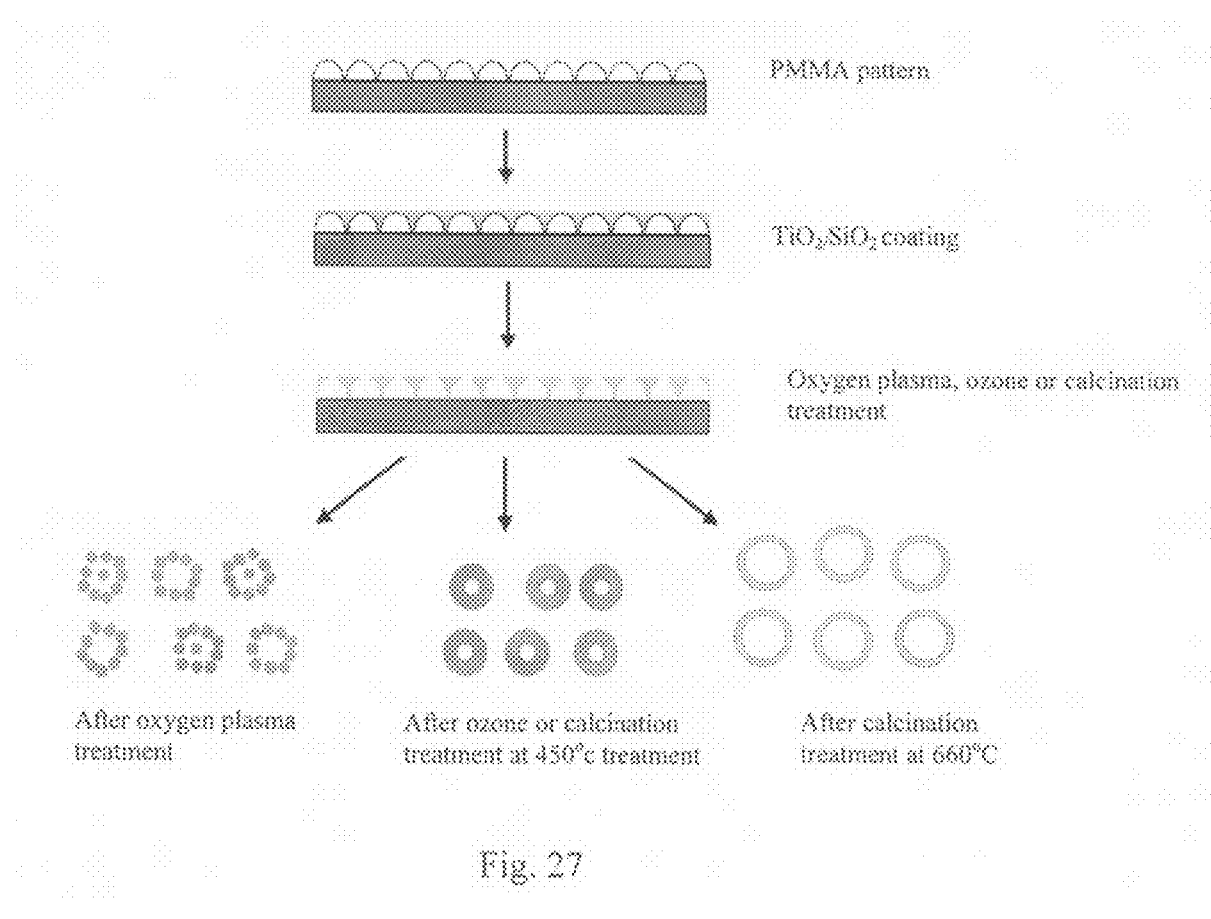
FIG. 27 summarizes the procedures for preparing nano-bottle, nano-bowl, nano-ring and nano-hole structures.

FIG. 27 summarizes the procedures for preparing nano-bottle, nano-bowl, nano-ring and nano-hole structures.

4. Applications of Nanotextured Surfaces

Self-Cleaning, Germicidal Surface Coating

Figure 28:
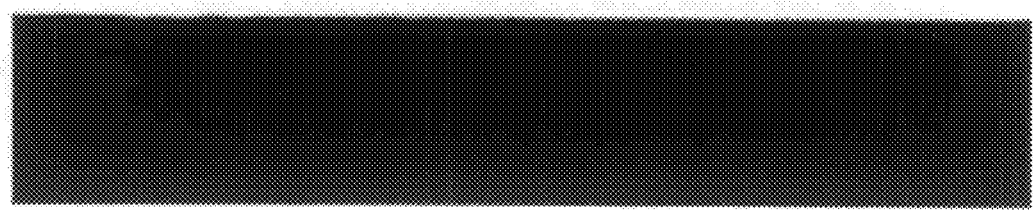
FIG. 28 shows contact angle of water droplet on TiO$_2$ film.
Figure 29:
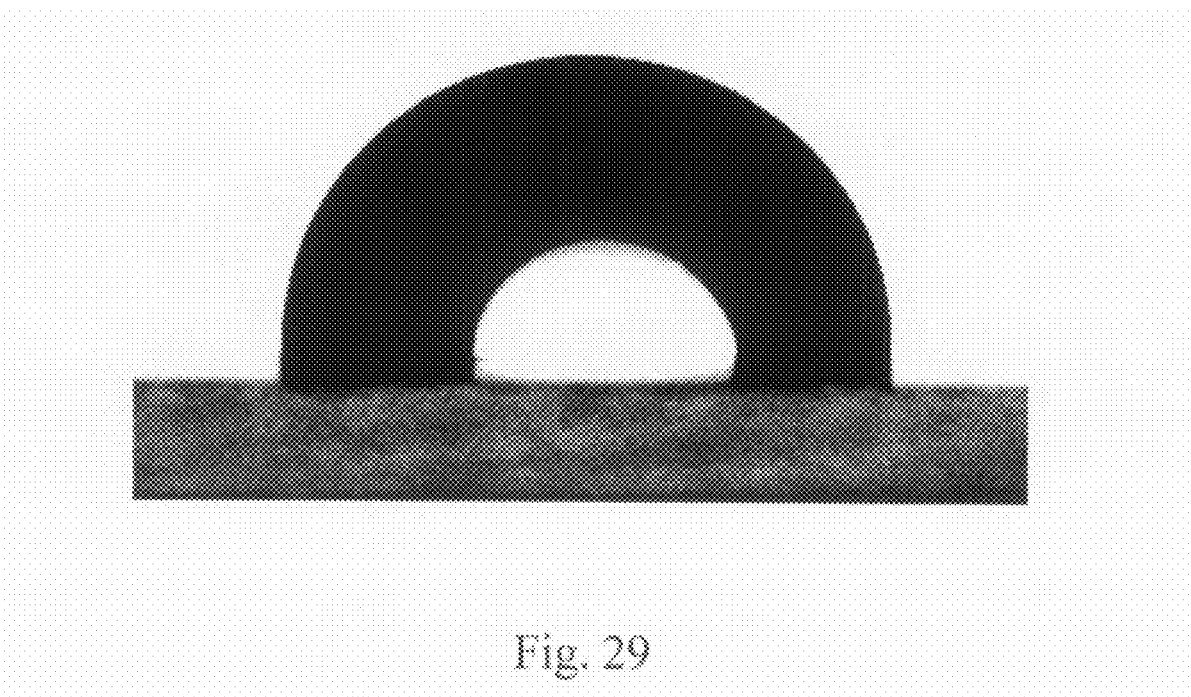
FIG. 29 shows contact angle of water droplet on TiO$_2$ film with nanotextured SBS layer.
Figure 30:
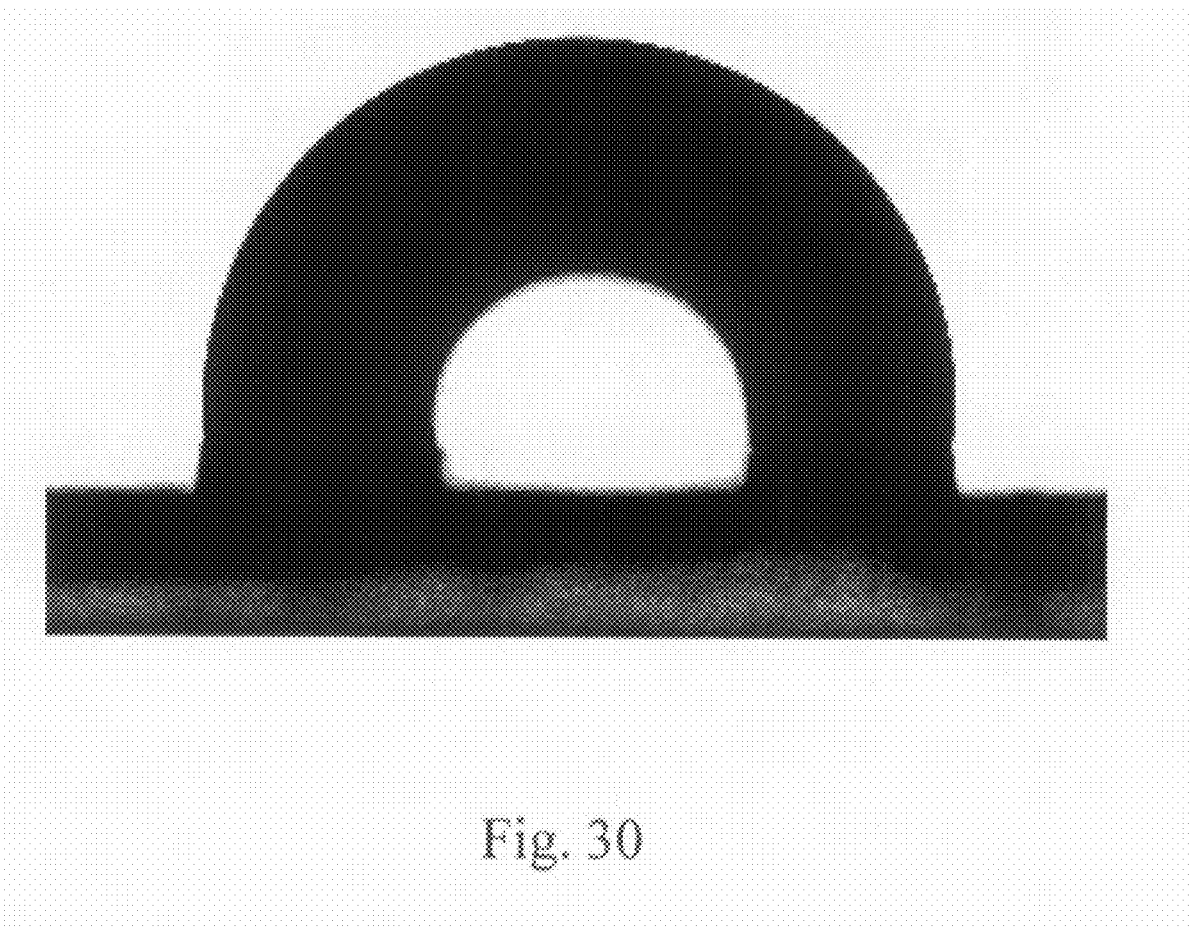
FIG. 30 shows contact angle of water droplet on TiO$_2$ film with nanotextured SBS layer.

A self-cleaning, germicidal surface coating combining the self-cleaning properties of lotus-leaf effect (i.e., superhydrophobicity) and germicidal properties of $TiO_2$-based coating could be prepared according to this disclosure. Applications include indoor and outdoor surface protection coating, appliance and equipment coating, kitchenwares, toiletwares, glasses, mirrors, tiles, toilet bowls and seats, sinks and furniture. Self-cleaning, germicidal surface coating will also be useful for exterior and interior coatings for vehicles including cars, trains, boats, planes and others. FIG. 28 shows the well known superhydrophilic property of a $TiO_2$ thin film. Water placed on $TiO_2$ thin film has a contact angle of 0 and spreads even over the surface. Although useful in many applications, this property tends to also spread germs and bacteria over the entire surface. FIG. 29 shows a similar $TiO_2$ coated surface coated with nanotextured SBS. The contact angle of the water droplet was increased to ~100° making the surface hydrophobic and preventing the spread of contaminated liquid droplets over the entire surface. FIG. 30 shows a similar $TiO_2$ coated surface coated with nanotextured SBS. The contact angle of the water droplet was increased to >100° making the surface superhydrophobic. This allows the droplet to freely flow away from the surface (i.e., lotus-leaf effects), while minimizing surface contact with the contaminated liquid droplets.

Nanotextured Polymer Surfaces for LCD and Lighting

Nanotextured surfaces have application for liquid crystal display (LCD) and lighting. The nanotextured polymers obtained according to one embodiment of the present subject matter may be used to pre-set the tilt angle for LCD enabling better display performance. Coating anatase $TiO_2$ or rutile $TiO_2$ nanoparticles onto the nanotextured polymers according to one embodiment of the present subject matter may enhance lighting performance for LCD. Similar or higher enhancement may be obtained by coating aligned carbon nanotubes.

Nanotextured Polymer Surfaces for Surface Coating

Nanotexturing of polymer changes their surface wetting properties. Superhydrophilic and superhydrophobic properties as described above may be designed by simply changing the size and shape of the polymer nanotexture. Applications include surface coatings and finishing, anti-corrosion coatings, non-stick surface, anti-stain coatings, anti-fogging coating and others.

Nanotextured $TiO_2$ Surface.

The nanotextured $TiO_2$ surfaces according to one embodiment of the present subject matter transform a superhydrophilic surface into a superhydrophobic surface. This allows the droplet to freely flow away from the surface (i.e., lotus-leaf effects), while minimizing surface contact with the contaminated liquid droplets. This results in a combined lotus-leaf effect and surface germicidal properties. Applications include indoor and outdoor surface protection coating, appliance and equipment coating, kitchenwares, toiletwares, glasses, mirrors, tiles, toilet bowls and seats, sinks and furniture. Self-cleaning, germicidal surface coating will also be useful for exterior and interior coatings for vehicles including car, trains, boats, planes and others.

Immobilization of Biomolecules in $SiO_2$ Nano-Bowls.

Figure 31:
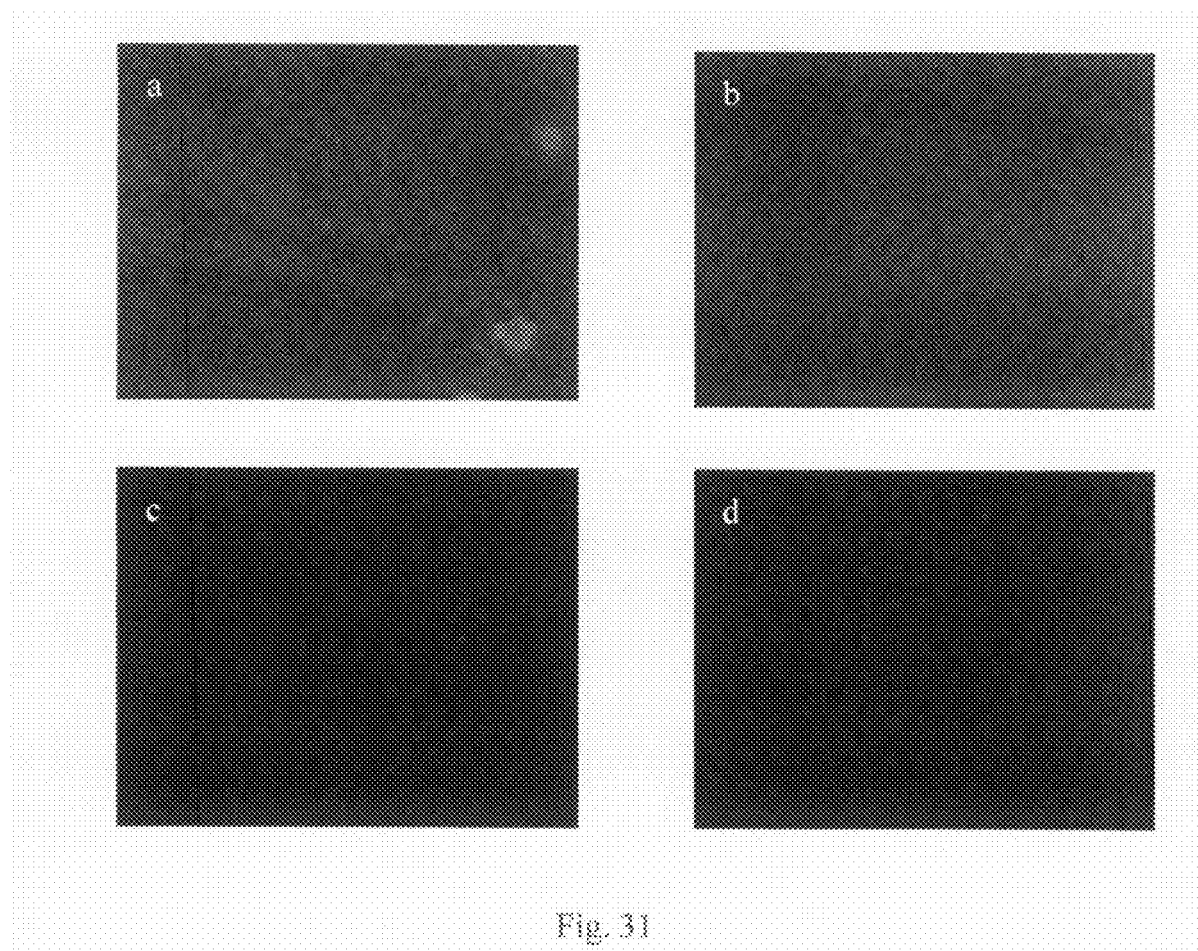
FIGS. 31 (a) and (b) show fluorescent signal from BSA-FITC immobilized on SiO$_2$ nano-bowls, as compared to that of a flat SiO$_2$ film in FIGS. 31(c) and (d).

Immobilization of biomolecules (e.g., proteins, enzymes, DNA, cells) is important for drug screening, medical diagnosis, DNA chips and Bio-MEMS. As tested in the present disclosure (Example 29), the increased fluorescent signal shown in FIG. 31 for BSA-FITC immobilized on $SiO_2$ nano-bowls indicates the successfully immobilization of the BSA biomolecules in contrast to that of the non-textured surface.

Storage in Nano-Bottles

Chemicals including drugs, reagents, fragrances and germicides may be stored in the nano-bottles for controlled or programmed released for applications in sensor, medicine, cosmetic and personal-care products.

Odor Removal and Adsorption in Inorganic Oxide Nano-Bottles

The $TiO_2$ and $SiO_2$ nano-bottles are able to adsorb molecules and could be used to remove malodor from the environment.

Inorganic Oxide Nano-Holes

The $TiO_2$, $SiO_2$ and Si nano-holes according to one embodiment of the present subject matter (Examples 26 and 27) have applications as nanoporous membranes for molecular separation and sensor barriers. They also have uses in microelectronic and microelectromechanical systems.

EXAMPLES

The embodiment of the present subject matter will be described below in further detail with reference to the examples, but the present subject matter is not intended to be limited to these examples.

In the examples, the thickness of the film obtained was determined by an Ellipsometric Thin Film Thickness Measurement System (L116C, Gaertner).

Further, the samples obtained were imaged using AFM (Digital Instruments, Nanoscope IIIa). A piezoelectric scanner (type J) with a scan size of 125×125 $\mu m^2$ and a vertical movement of 5 μm was used to image the film morphology.

Further, X-ray photoelectron spectroscopy (XPS, Physical Electronics PHI 5600) was used to determine the surface chemical composition. The sample was mounted on a holder and placed in the XPS chamber. The sample was outgassed at ultrahigh vacuum and irradiated with monochromatic AlKα X-ray.

Example 1

Preparation of a Silicon Wafer

A silicon wafer (Si(100) wafer) was cut into 1×1 cm pieces. The diced wafers were ultrasonicated in acetone followed by ethanol and Distilled deionized (DDI) water for 30 minutes each. The wafers were further cleaned in a $2H_2SO_4:H_2O_2$ solution at 353 K for 20 minutes before a final rinse in DDI water and drying in an oven.

Example 2

Preparation of PMMA Solution 1.32 g of PMMA (Polysciences, Inc) with an average molecular weight of 25,000 g/mol was added into 18.02 ml of chlorobenzene (Merck-schuchardt) solution under vigorous stirring at 373K until a completely transparent solution of PMMA was obtained. The concentration of the as-prepared PMMA solution was 73.70 mg/ml.

Example 3

Preparation of SBS Solution 300 mg of SBS (Finaprene) was added into 10 ml of toluene (Aldrich) solution under vigorous stirring condition at 403 K until a completely transparent solution of SBS was obtained. The concentration of the as-prepared SBS solution was 30 mg/ml.

Example 4

Preparation of SBS Solution 10 mg of SBS (Finaprene) was added into 10 ml of toluene (Aldrich) solution under vigorous stirring at 403 K until a completely transparent solution of SBS was obtained. The concentration of the as-prepared SBS solution was 1 mg/ml.

Example 5

Spin-Coating of PMMA Solution 0.022 g of PMMA (Polysciences, Inc) with an average molecular weight of 25,000 g/mol was added into 18 ml of chlorobenzene (Merck-schuchardt) solution under vigorous stirring at 373K until a completely transparent solution of PMMA was obtained. The concentration of the as-prepared PMMA solution was 1.23 mg/ml. Using a spin-coating device, Speciality Coating System, Inc., Model, P-6204, 30 μl of the PMMA solution obtained was deposited at 2000 rpm for 60 seconds on the silicon wafer prepared according to Example 1. An AFM picture of the spin-coated PMMA film obtained is shown in FIG. 1.

Examples 6-11

Spin-Coating of PMMA Solutions

Using the same preparation method as described in Example 2, except for the concentration of PMMA solution and the rotation speed, various PMMA solutions were prepared. 30 μl of each PMMA solution was deposited on the silicon wafer prepared according to Example 1 using a spin-coating device, Speciality Coating System, Inc., Model, P-6204, as follows:

Example 6

30 μl of 1.23 mg/ml PMMA/chlorobenzene spin-coated at 2000 rpm;

Example 7

30 μl of 1.23 mg/ml PMMA/chlorobenzene spin-coated at 4000 rpm;

Example 8

30 μl of 1.23 mg/ml PMMA/chlorobenzene spin-coated at 7000 rpm for 60 seconds;

Example 9

30 μl of 0.62 mg/ml PMMA/chlorobenzene spin-coated at 7000 rpm for 60 seconds;

Example 10

30 μl of 0.31 mg/ml PMMA/chlorobenzene spin-coated at 7000 rpm for 60 seconds;

Example 11

30 μl of 0.15 mg/ml PMMA/chlorobenzene spin-coated at 7000 rpm for 60 seconds;

The spin-coated PMMA films were outgassed at room temperature to remove the chlorobenzene solvent. The film thickness of each of the above samples was measured.

Example 12

Spin-Coating of SBS Solution

30 μl of 1 mg/ml SBS solution prepared according to Example 4 was spin-coated at 3000 rpm for 60 seconds on the silicon wafer prepared according to Example 1, using a spin-coating device, Speciality Coating System, Inc., Model, P-6204. The spin-coated SBS film was outgassed at room temperature to remove the toluene solvent. The film thickness of the film was measured.

Example 13

Spin-Coating of SU-8 Solution

SU-8 film was spin-coated on clean silicon wafer at a rotation speed of 1000 rpm and held at 4000 rpm for 30 seconds (Solite 5110-C/PD Wafer spinner). The SU-8 film was pre-baked on a hot plate at 338 K for 10 minutes followed by a soft bake at 368 K for 30 minutes before cooling to room temperature. The spin-coated SU-8 films were outgassed at room temperature to remove the solvent. The film thickness of the above samples was measured.

Example 14

Microwave-Assisted Hydrothermal Treatment of PMMA Films

The PMMA films prepared according to Examples 6-11 were transferred to a 100 ml Teflon lined vessel (MDR-1000/6/100/110) containing 50 ml of Distilled deionized (DDI) water. The Teflon vessel was placed in the microwave oven (MLS-1200 MEGA, MILESTONE) and irradiated with 60 W power for 15 minutes under constant rotation. After that, the vessel was cooled down and the samples were rinsed with DDI water and dried.

Figure 2A:
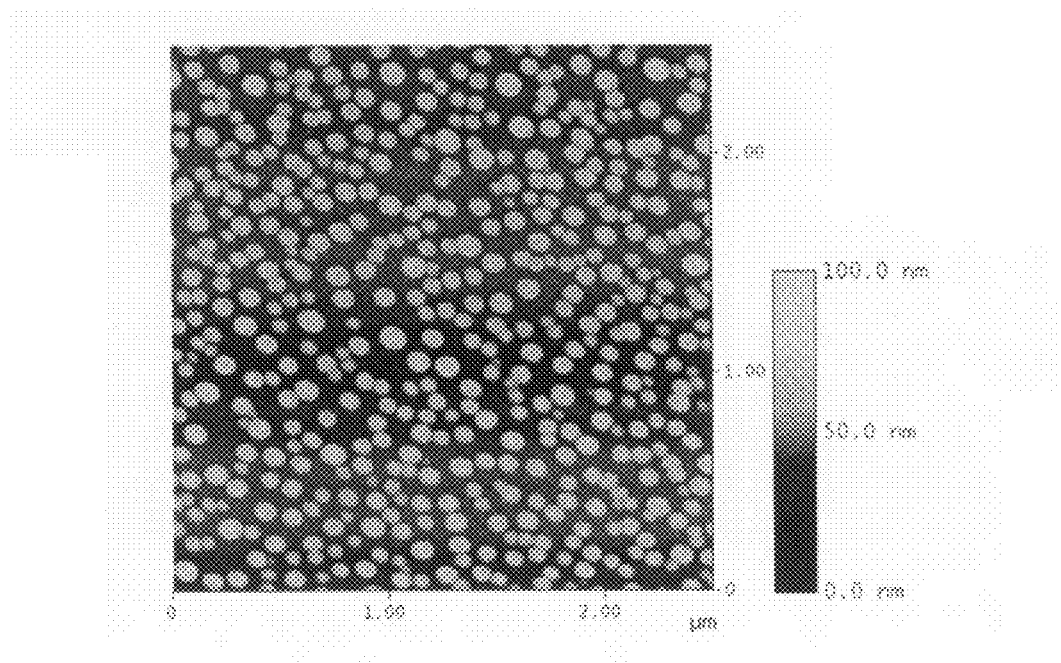
FIGS. 2(a) and (b) are AFM height and 3-D images of PMMA nanostructure with diameter of 83 nm and height of 38 nm produced according to the subject matter.
Figure 2B:
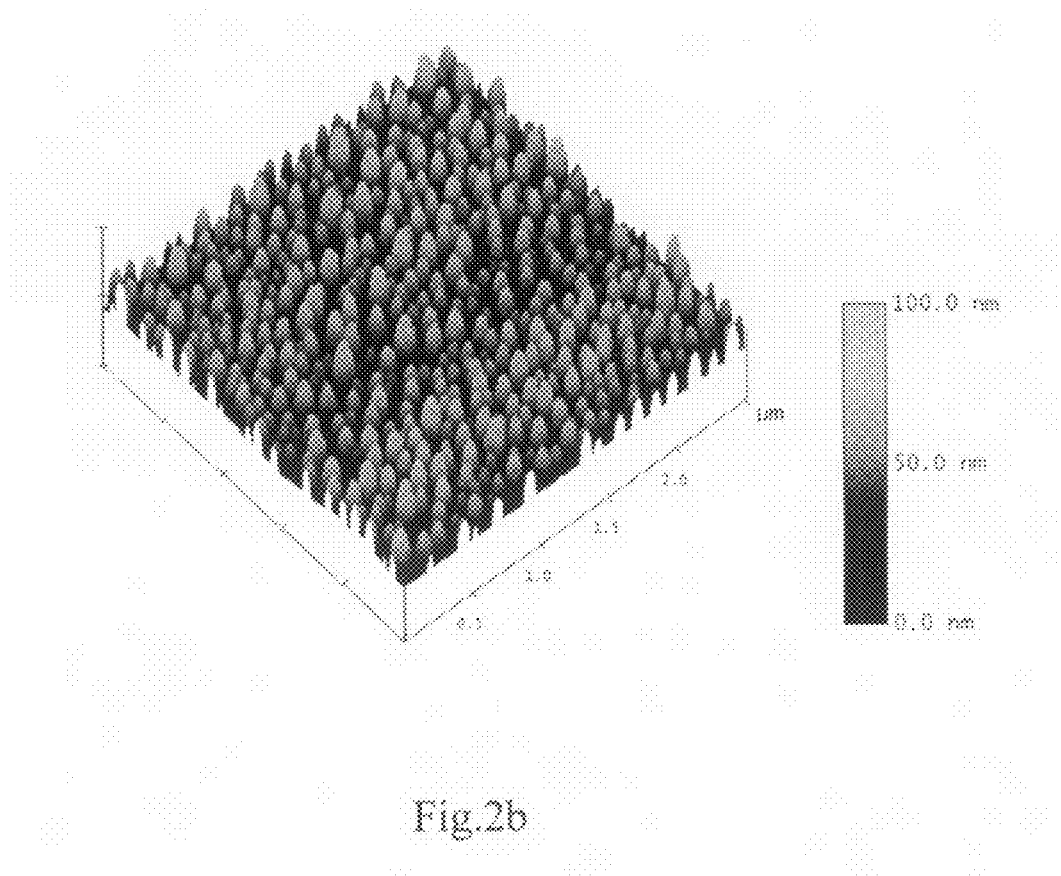
Figure 3A:
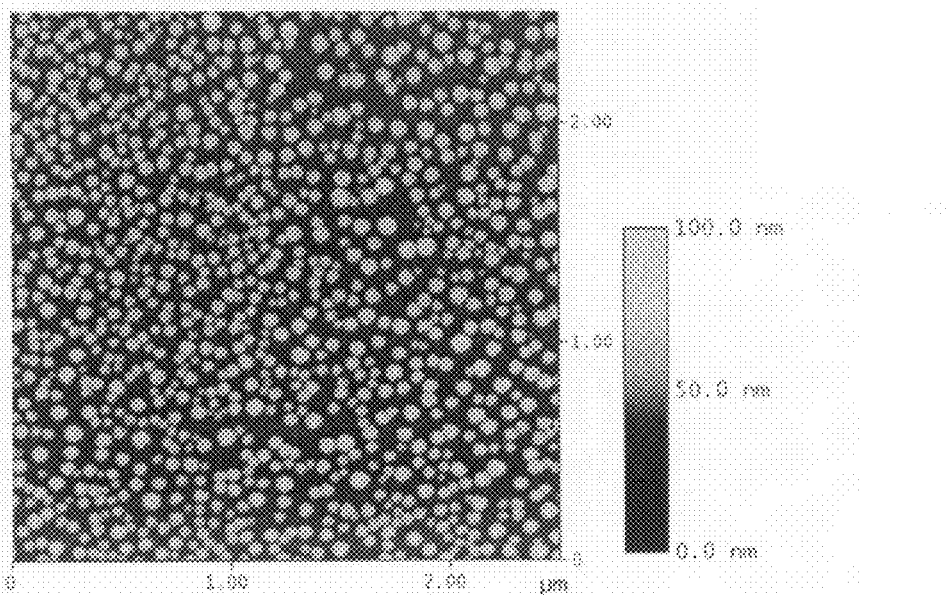
FIGS. 3(a) and (b) are AFM height and 3-D images of PMMA nanostructure with diameter of 63 nm and height of 28 nm produced according to the subject matter.
Figure 3B:
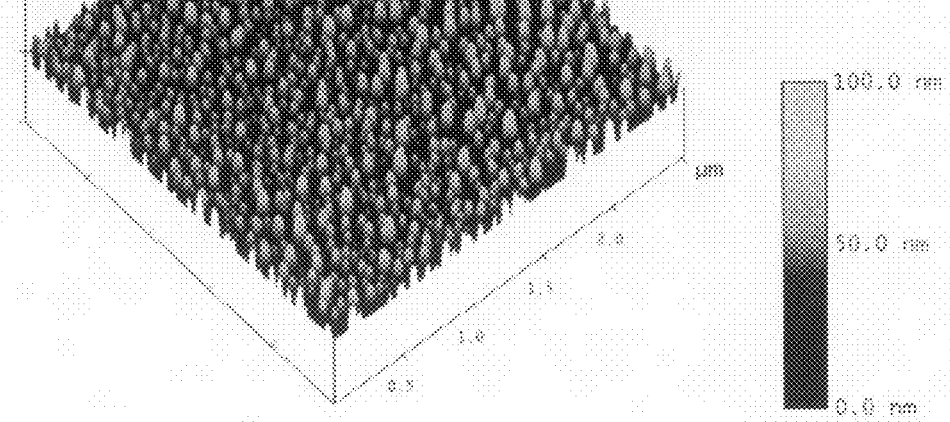
Figure 4A:
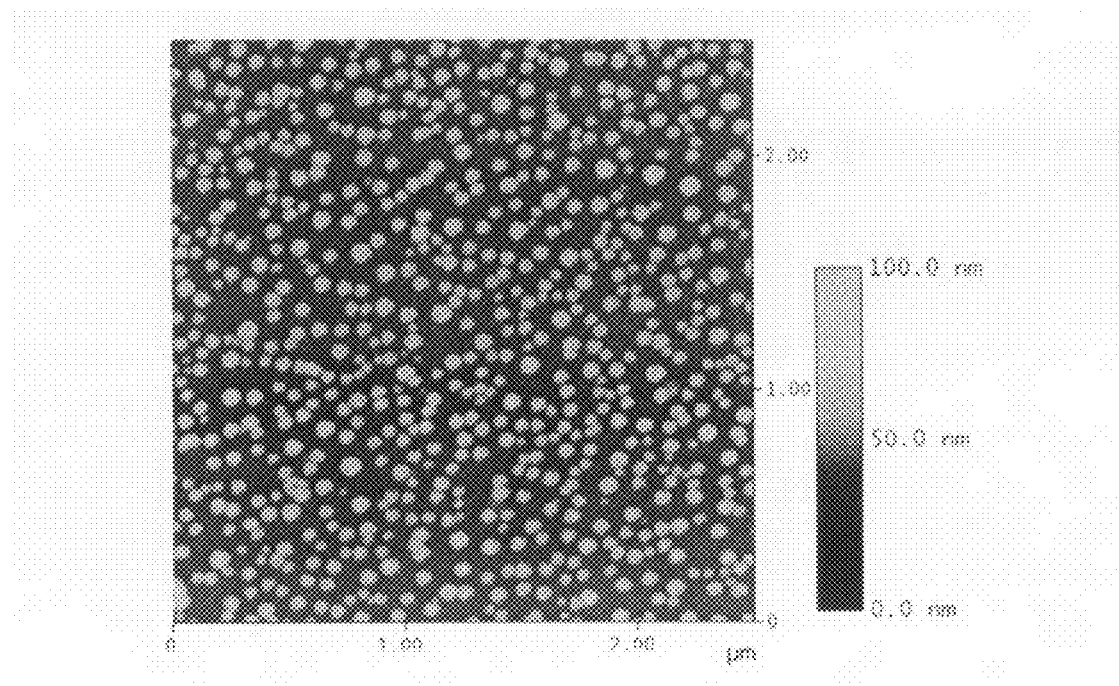
FIGS. 4(a) and (b) are AFM height and 3-D images of PMMA nanostructure with diameter of 59 nm and height of 24 nm produced according to one embodiment of the present subject matter.
Figure 4B:
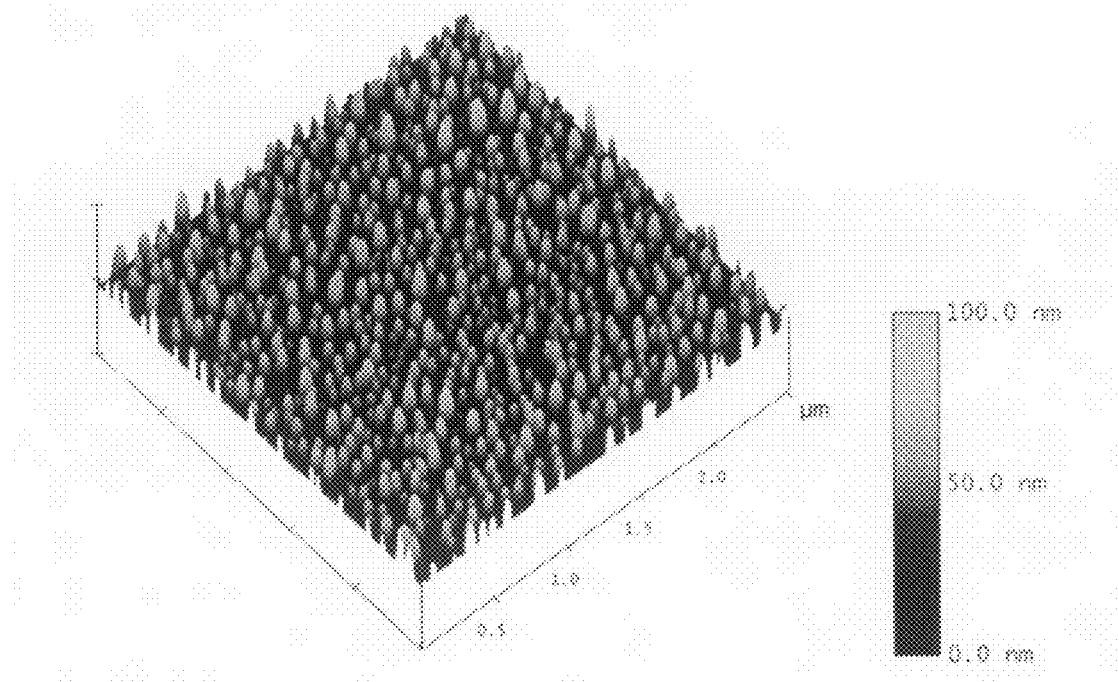
Figure 5A:
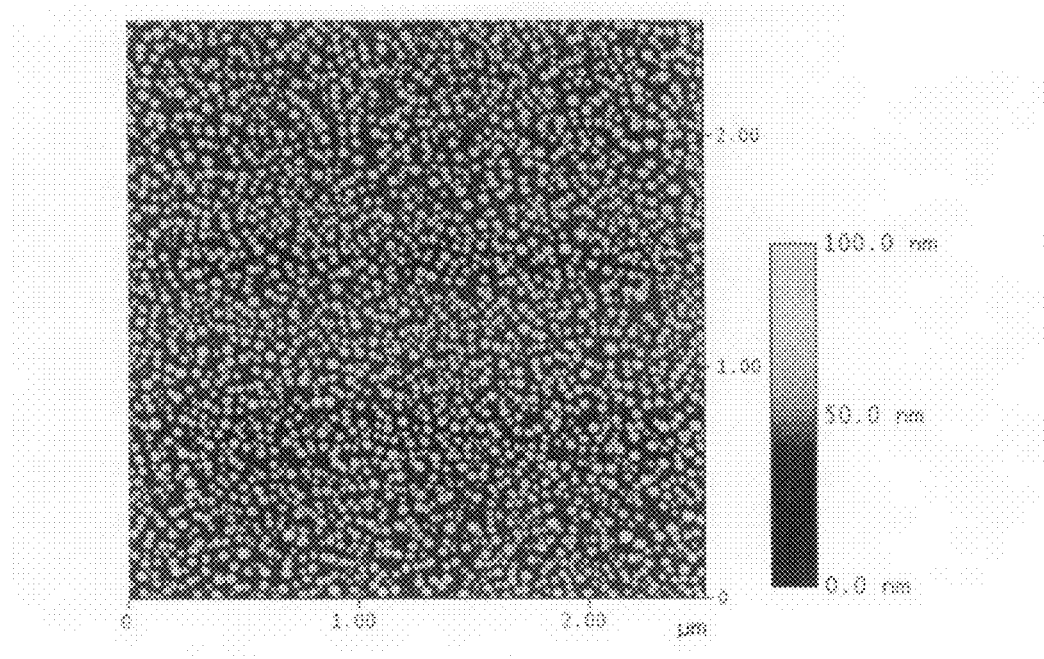
FIGS. 5(a) and (b) are AFM height and 3-D images of PMMA nanostructure with diameter of 48 nm and height of 19 nm produced according to the subject matter.
Figure 5B:
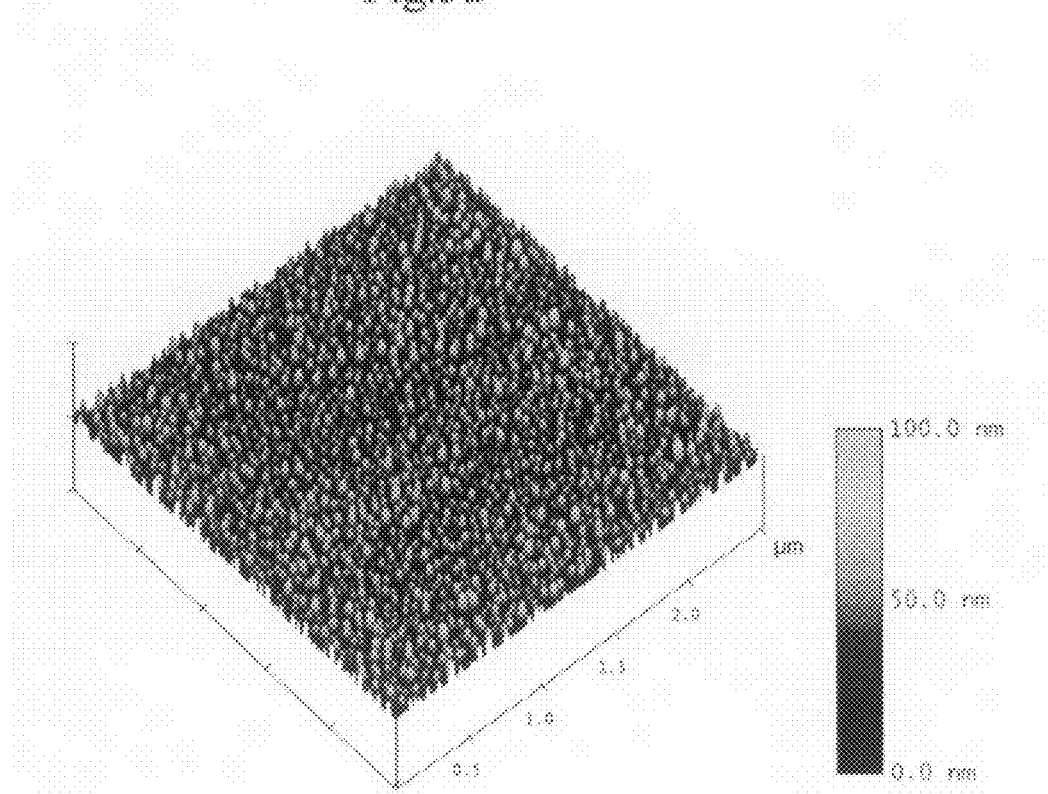
Figure 6A:
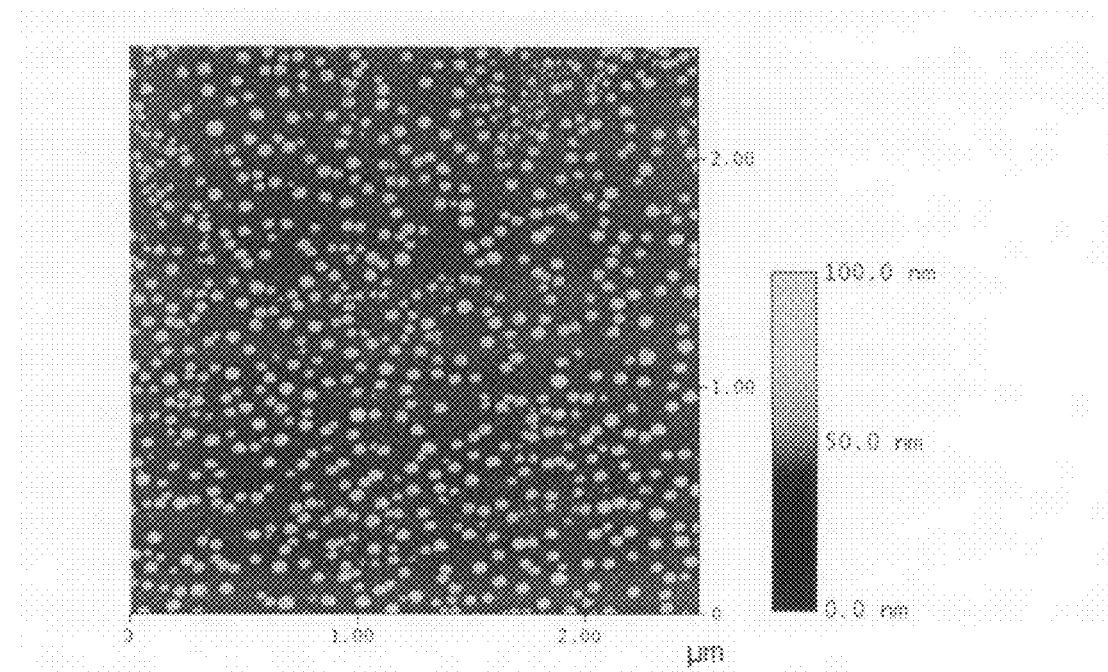
FIGS. 6(a) and (b) are AFM height and 3-D images of PMMA nanostructure with diameter of 41 nm and height of 18 nm produced according to the subject matter.
Figure 6B:
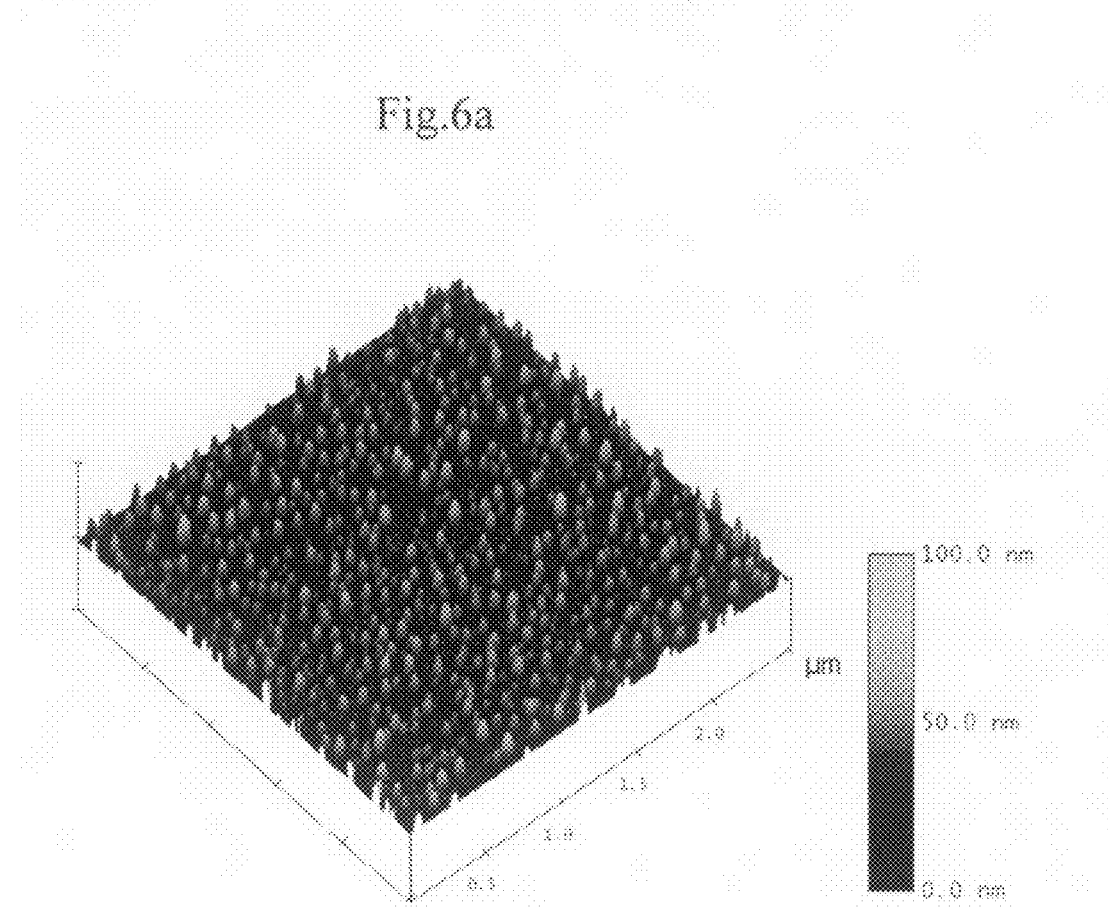
Figure 7A:
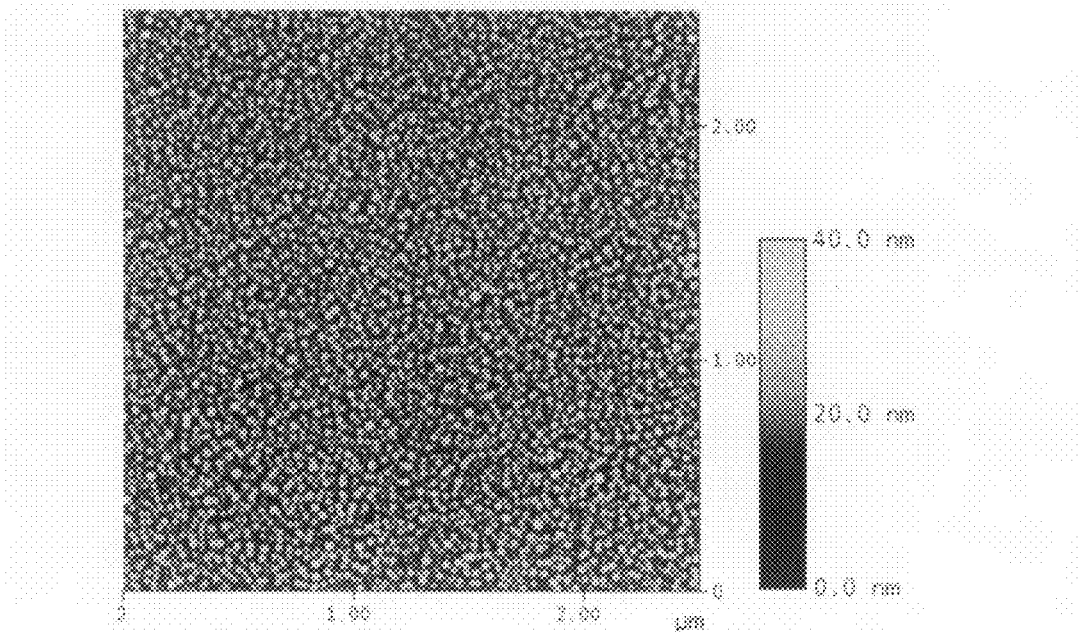
FIGS. 7(a) and (b) are AFM height and 3-D images of PMMA nanostructure with diameter of 26 nm and height of 6 nm produced according to the subject matter.
Figure 7B:
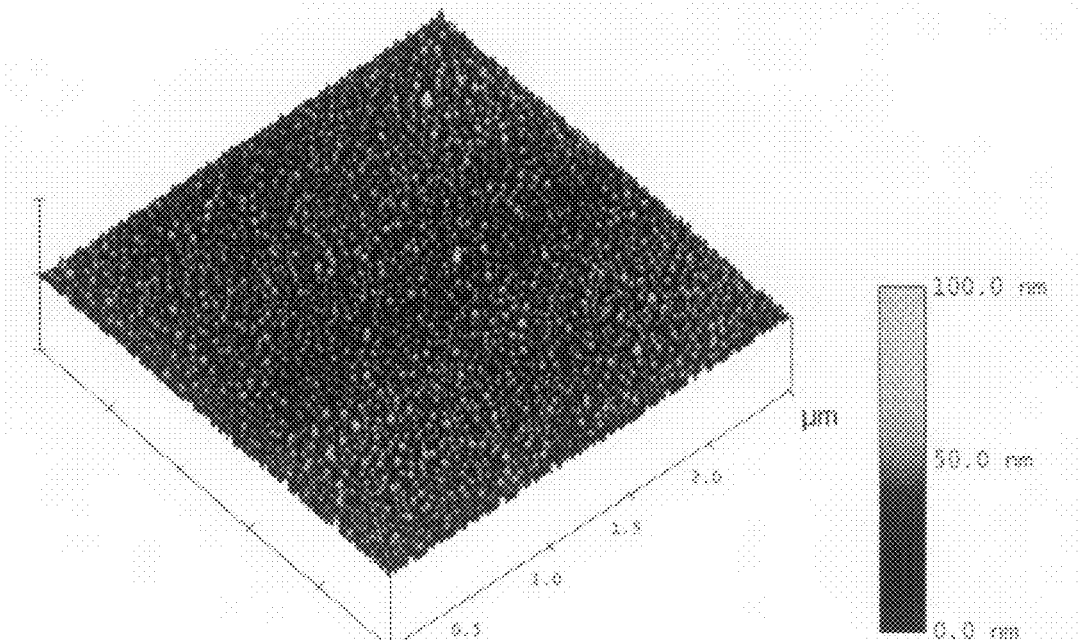
Figure 8:
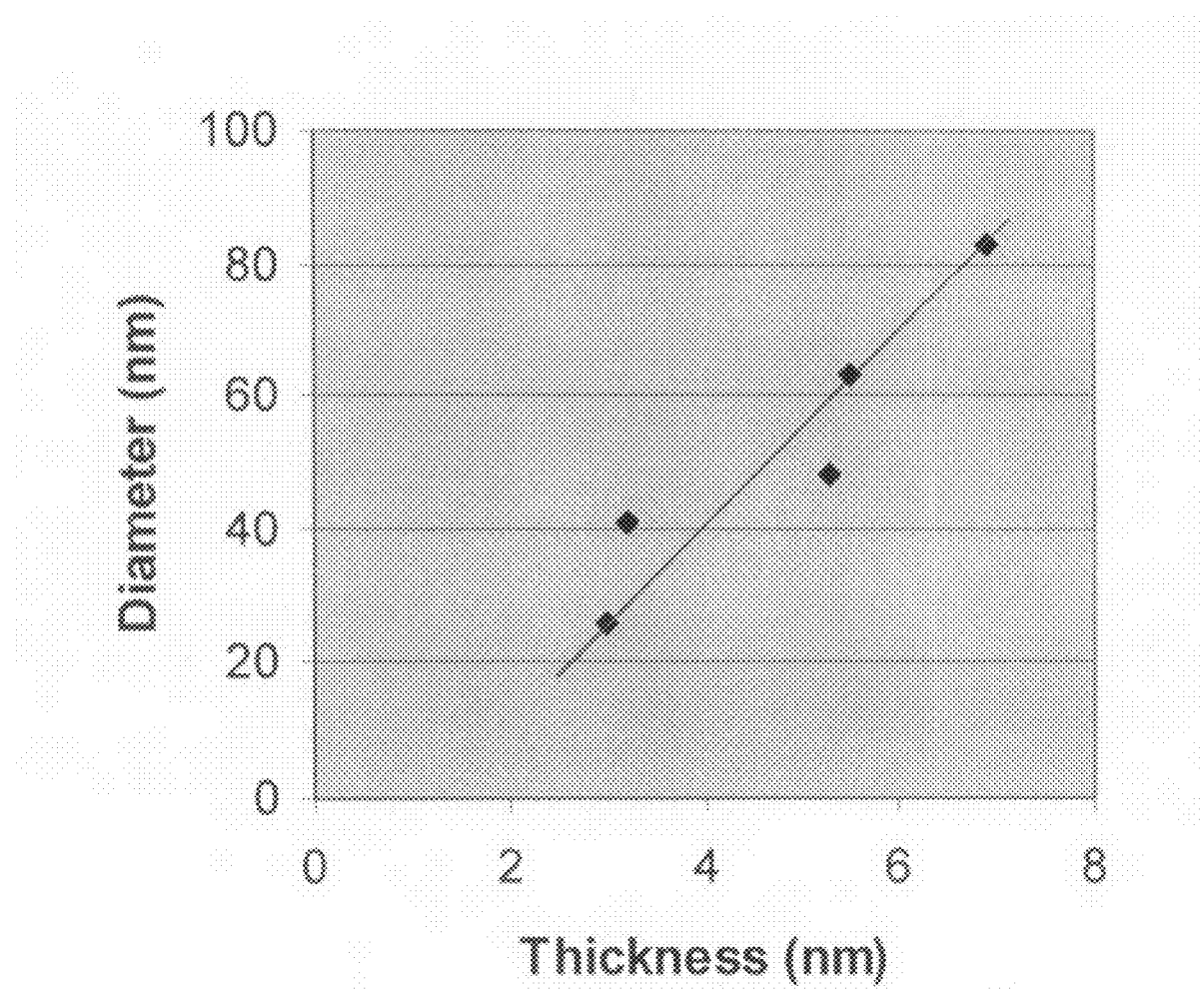
FIG. 8 illustrates the changes of the diameter of the PMMA nanostructure according to one embodiment of the present subject matter with varying PMMA film thickness.
Figure 9:
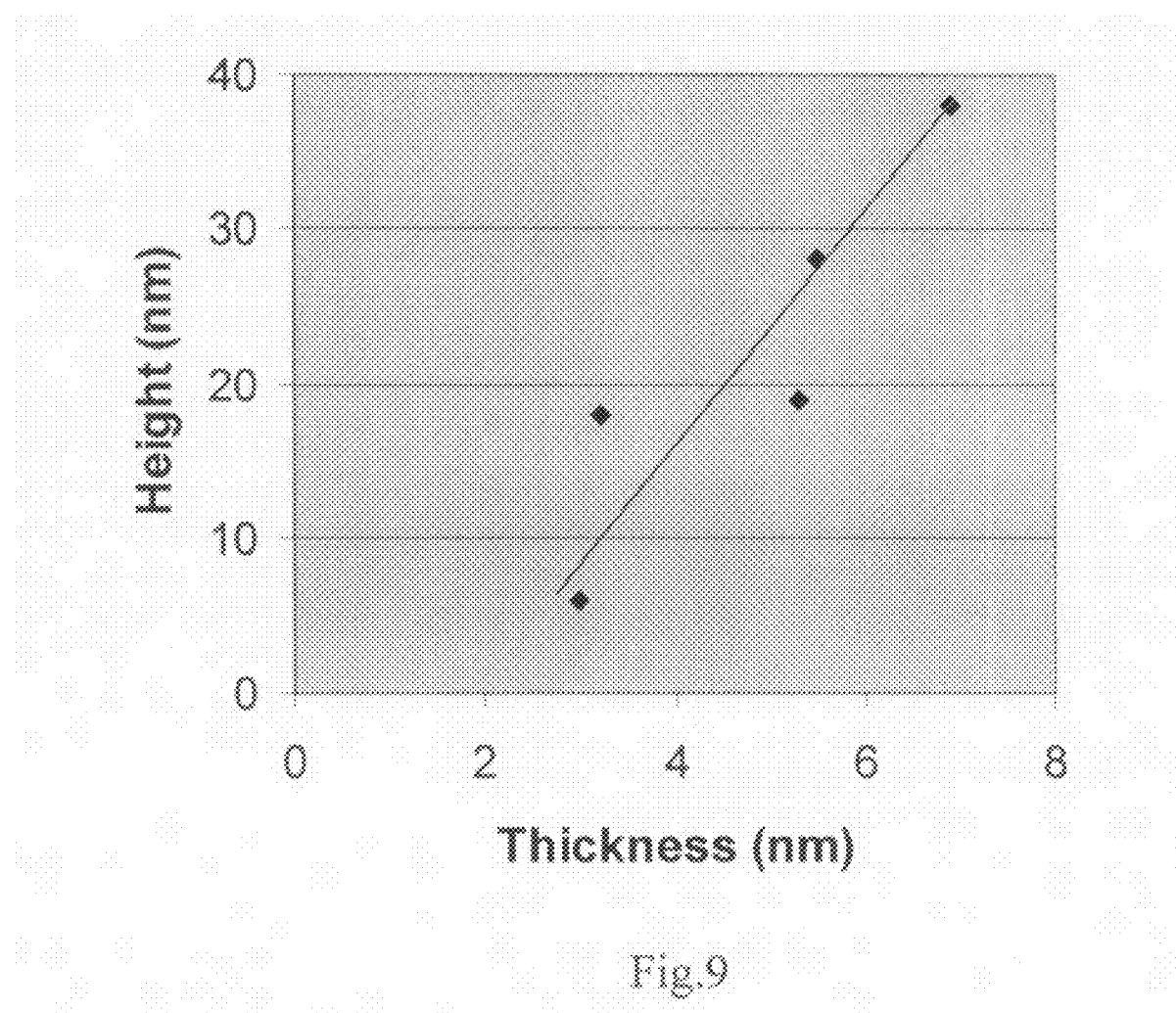
FIG. 9 illustrates the changes of the height of the PMMA nanostructure in accordance with the subject matter with varying PMMA film thickness.
Figure 10:
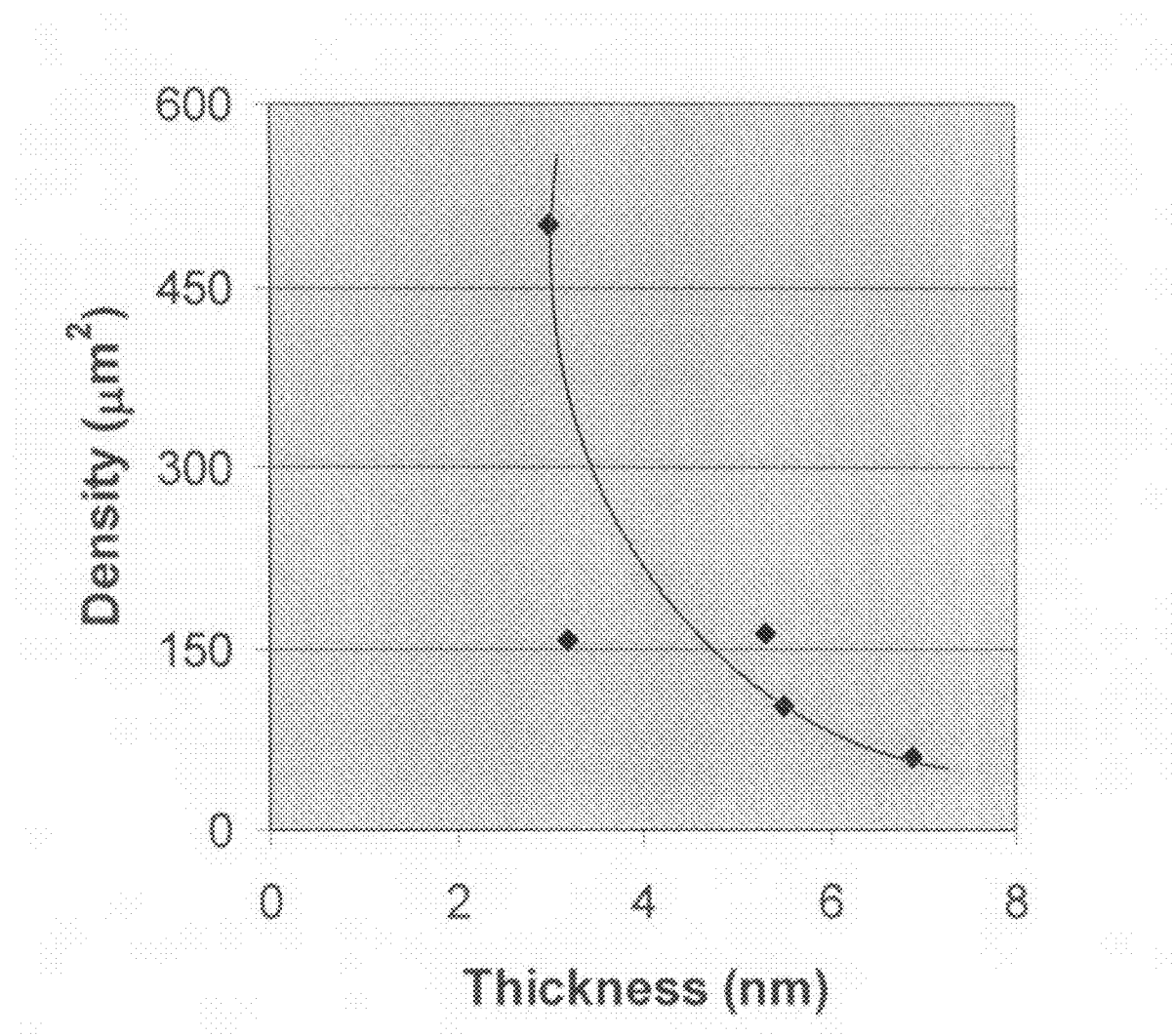
FIG. 10 illustrates the changes of the density of the PMMA nanostructure according to one embodiment of the present subject matter with varying PMMA film thickness.
Figure 11:
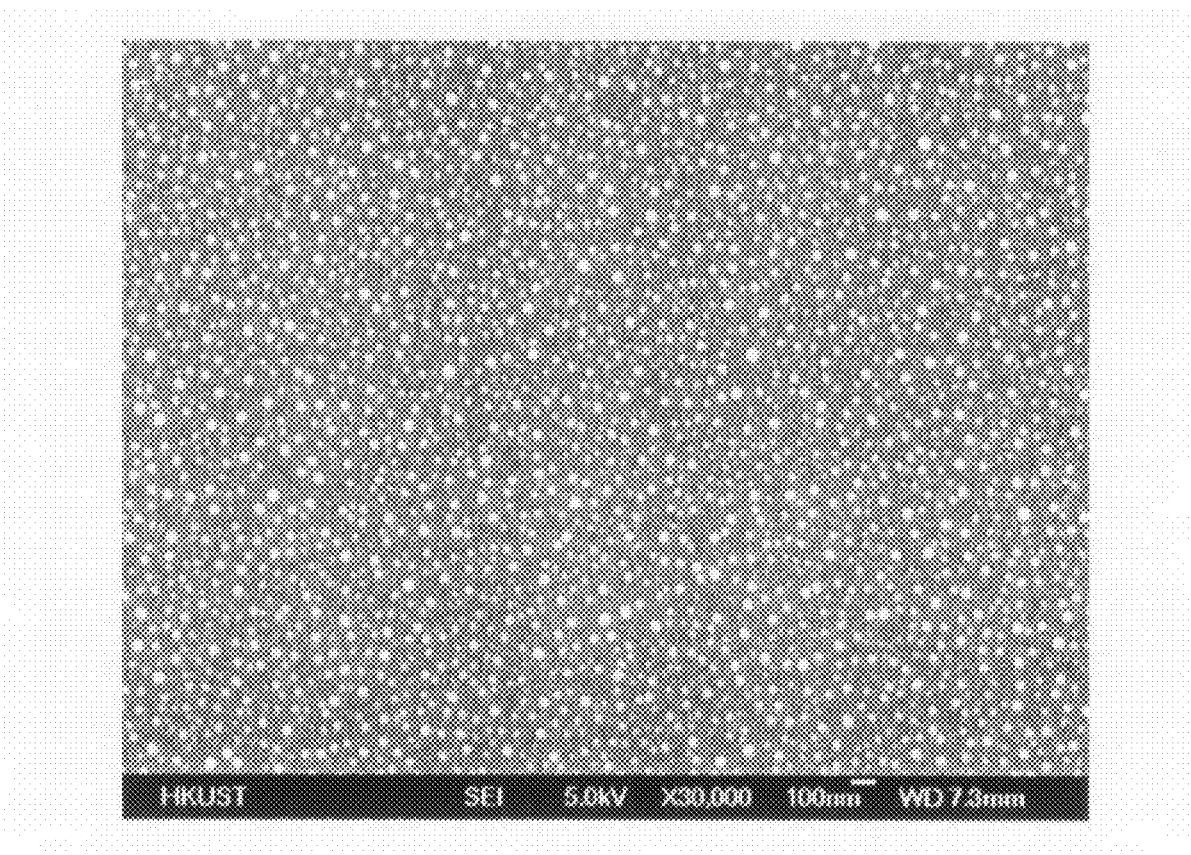
FIG. 11 is a Scanning Electron Microscopy (SEM) image of the PMMA nanostructure.

The AFM images were respectively displayed in FIGS. 2-7 for the effects of rotation speeds and PMMA concentrations after microwave-assisted irradiation: FIG. 2 shows the AFM image for the PMMA film according to Example 6 (i.e., 1.23 mg/ml PMMA/chlorobenzene spin-coated at 2000 rpm); FIG. 3 shows the AFM image for the PMMA film according to Example 7 (i.e., 1.23 mg/ml PMMA/chlorobenzene spin-coated at 4000 rpm); FIG. 4 shows the AFM image for the PMMA film according to Example 8 (i.e., 1.23 mg/ml PMMA/chlorobenzene spin-coated at 7000 rpm); FIG. 5 shows the AFM image for the PMMA film according to Example 9 (i.e., 0.62 mg/ml PMMA/chlorobenzene spin-coated at 7000 rpm); FIG. 6 shows the AFM image for the PMMA film according to Example 10 (i.e., 0.31 mg/ml PMMA/chlorobenzene spin-coated at 7000 rpm); FIG. 7 shows the AFM image for the PMMA film according to Example 11 (i.e., 0.15 mg/ml PMMA/chlorobenzene spin-coated at 7000 rpm).

Example 15

Microwave Assisted Hydrothermal Treatment of SBS Films

Figure 12A:
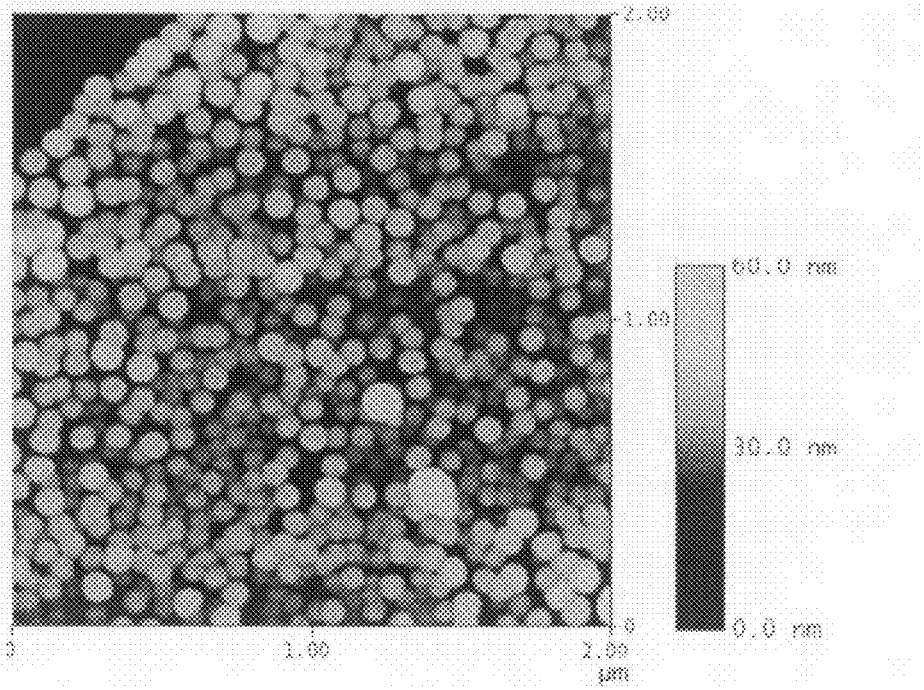
FIGS. 12(a) and (b) are AFM height and 3-D images of SBS nanostructure produced according to one embodiment of the present subject matter.
Figure 12B:
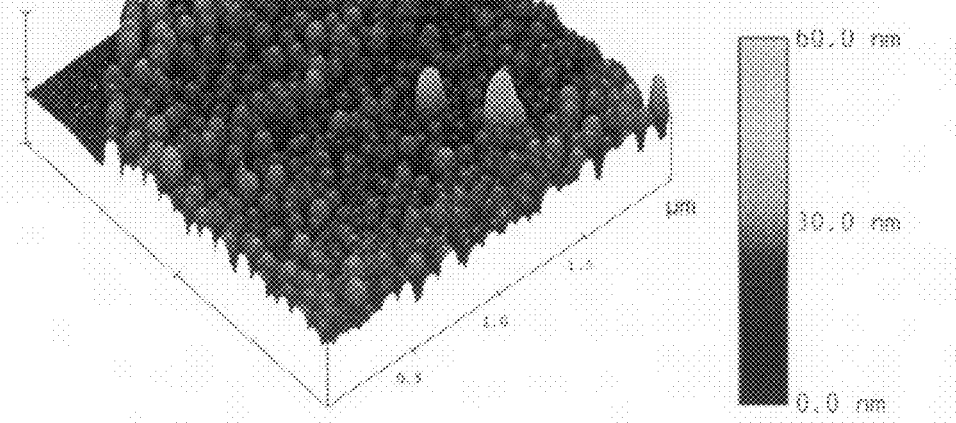

The SBS film prepared according to Example 12 was transferred to a 100 ml Teflon lined vessel (MDR-1000/6/100/110) containing 50 ml of distilled deionized (DDI) water. The Teflon vessel was placed in the microwave oven (MLS-1200 MEGA, MILESTONE) and irradiated with 60 W power for 15 minutes under constant rotation. The vessel was cooled down and the film sample was rinsed with DDI water and dried. The AFM image of the nanotextured surface prepared from the SBS film was shown in FIG. 12. A bimodal distribution consisting of 20 and 80 nm was observed.

Example 16

Microwave Assisted Hydrothermal Treatment of SU-8 Film

Figure 13A:
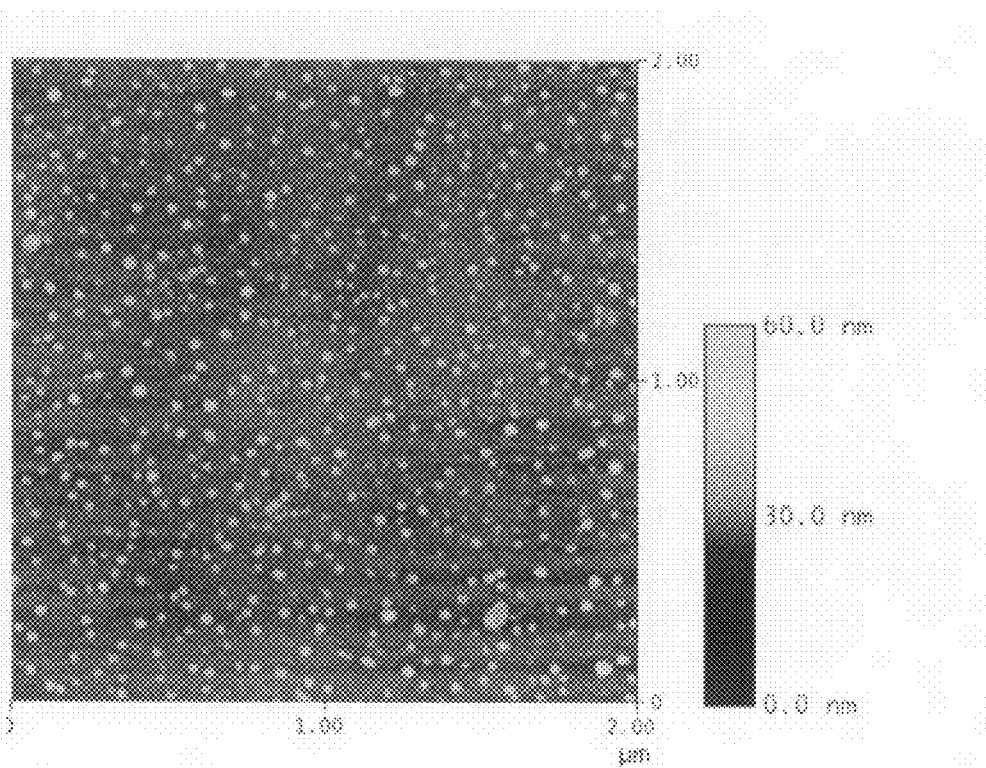
FIGS. 13(a) and (b) are AFM height and 3-D images of SU-8 nanostructure produced according to one embodiment of the present subject matter.
Figure 13B:
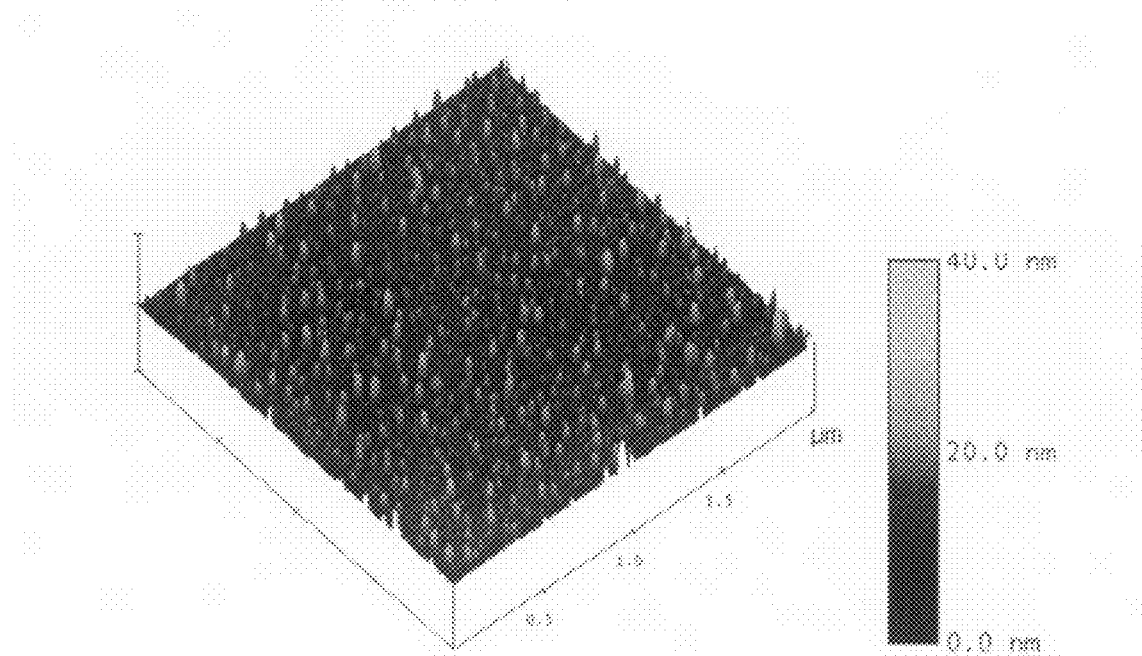

The SU-8 films were transferred to a 100 ml Teflon lined vessel (MDR-1000/6/100/110) containing 50 ml of distilled deionized (DDI) water. The Teflon vessel was placed in the microwave oven (MLS-1200 MEGA, MILESTONE) and irradiated with 60 W power for 15 minutes under constant rotation. The vessel was cooled down and the sample was rinsed and dried. FIG. 13 displays the AFM image of the nanotextured surface prepared from SU-8 film. An average size of 40 nm was obtained.

Example 17

Preparation of $TiO_2$ Nanotextured Surface

A 0.05 mol/L $TiO_2$ sol was spin-coated on a silicon surface with PMMA nanotexture at a 6000 rpm, using a spin-coating device (Speciality Coating System, Inc., Model, P-6204). After spin-coating the sample was outgassed at room temperature to remove the solvent. The sample was imaged using AFM. Spin-coating a dilute $TiO_2$ sol at high rotation speed coated the polymers with a thin layer of $TiO_2$ as shown in FIG. 14($b$). FIG. 14($a$) shows the PMMA coated silicon surface after the microwave irradiation treatment but before the $TiO_2$ spin-coating. XPS analysis indicated that spin coating uniformly coated $TiO_2$ on the entire surface of the sample.

Example 18

Preparation of $SiO_2$ Nanotextured Surface

A 0.05 mol/L $SiO_2$ sol in ethanol was spin-coated on a silicon surface with PMMA nanotexture at a 6000 rpm (Speciality Coating System, Inc., Model, P-6204). After spin-coating the sample was outgassed at room temperature to remove the solvent. The sample was imaged using AFM. Spin-coating a dilute $SiO_2$ sol at high rotation speed coated the polymers with a thin layer of $SiO_2$ as shown in FIG. 15($b$). FIG. 15($a$) shows the PMMA coated silicon surface after the microwave irradiation treatment but before the $TiO_2$ spin-coating. XPS analysis indicated that spin coating uniformly coated $SiO_2$ on the entire surface of the sample.

Example 19

Preparation of Nanotextured $TiO_2$ Surface with Nano-Bottles

Figures 16C, 16D:
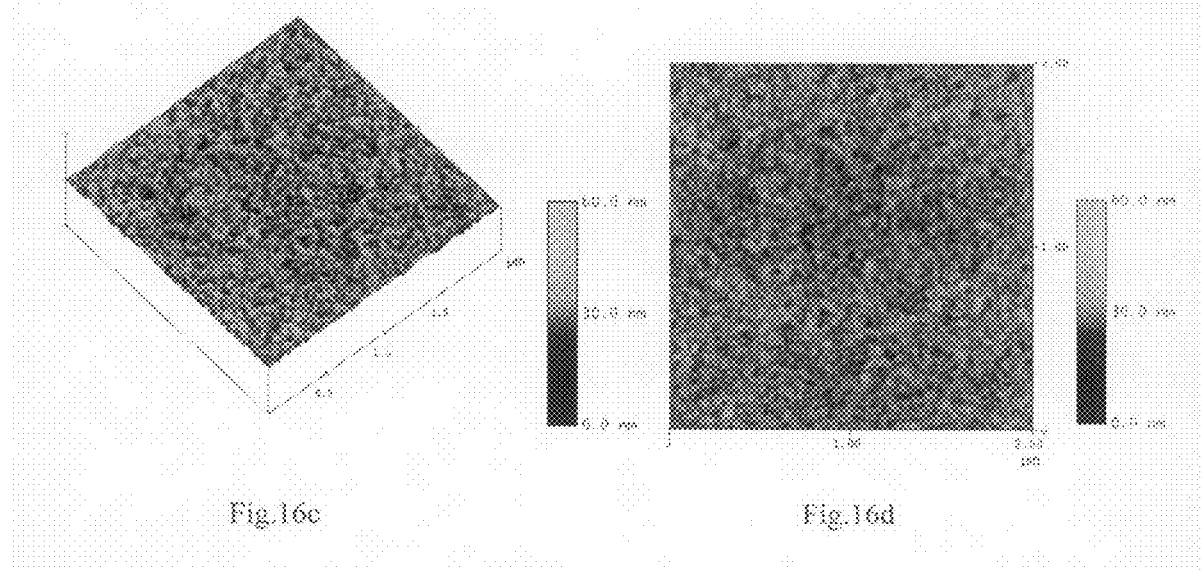
Figure 17:
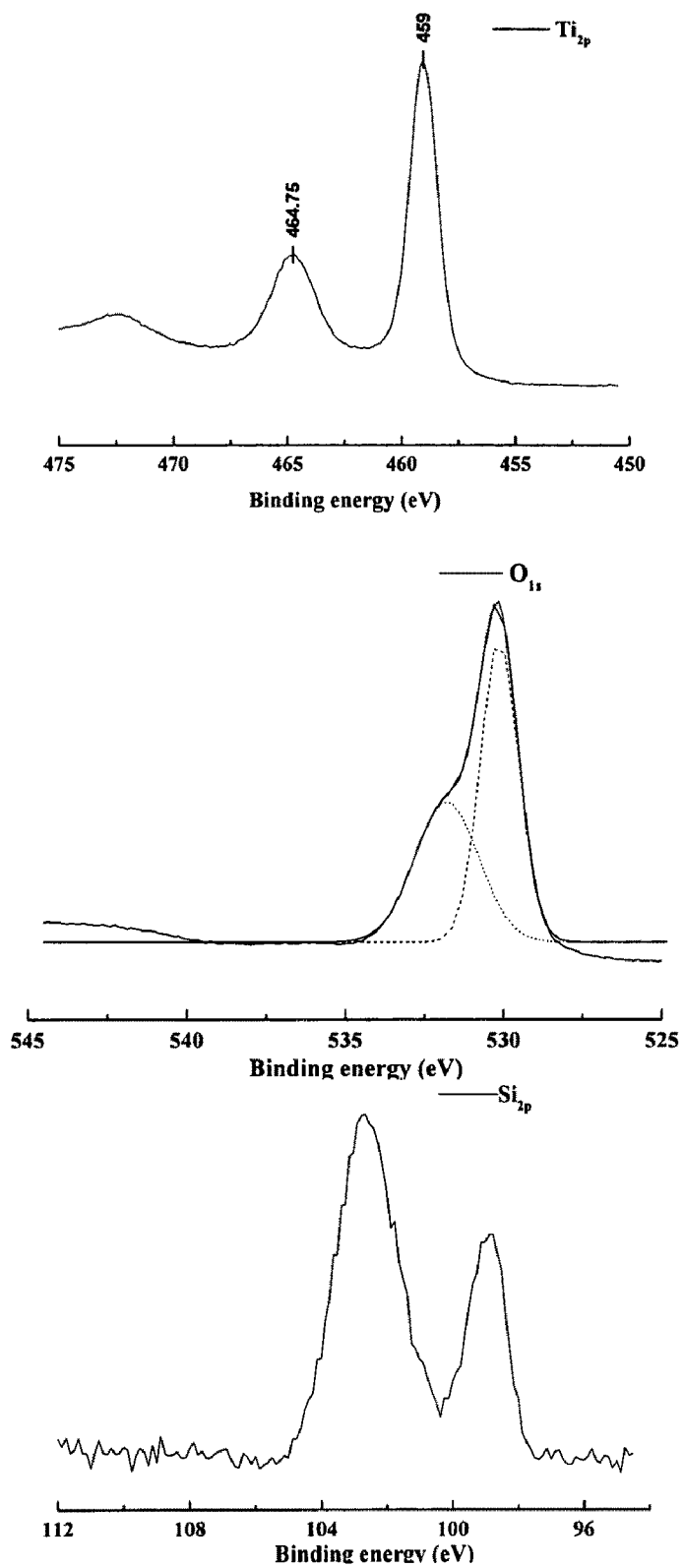
FIG. 17 shows the XPS measurement on the nanotextured $TiO_2$ surface with nano-bottle features according to one embodiment of the present subject matter.

The $TiO_2$ coated sample prepared according to Example 17 was placed in a reactor and heated to 473 K at 3 K/min. The polymer template was removed by 250 sccm of 100 g/m³ $O_3$ in $O_2$ gas mixture at 473 K for 5 to 6 h. The sample was cooled to room temperature and removed for analysis. The obtained AMF image of $TiO_2$ nanotextured surface that consists of nano-bottle features was shown in FIGS. 16($a$) and ($b$). For comparison, the surface feature of a similarly prepared $TiO_2$ film spin-coated on silicon was shown in FIGS. 16($c$) and ($d$). It made clear that the nano-bottles are the result of the preparation procedure according to the present subject matter. XPS analysis of the sample indicated a uniform $TiO_2$ surface coverage. FIG. 17 shows two peaks located around 459 and 465 eV belonging to $Ti^{4+}2p_{3/2}$ and $2p_{1/2}$.

Example 20

Preparation of TiO$_2$ Nano-Bottles

The TiO$_2$ coated sample prepared according to Example 17 was placed in a furnace and calcined in air at 723 K for 10 h. The sample was cooled to room temperature and removed for analysis. The sample was imaged using AFM. The obtained TiO$_2$ nanotextured surface that consists of nano-bottle features was shown in FIGS. 18(*a*) and (*b*). For comparison, the surface feature of a similarly prepared TiO$_2$ film spin-coated on silicon was shown in FIGS. 18(*c*) and (*d*). It made clear that the nano-bottles were the result of the preparation procedure according to the present subject matter. XPS analysis of the sample indicated a uniform TiO$_2$ surface coverage.

Example 21

Preparation of SiO$_2$ Nano-Bottles

Figure 19B:
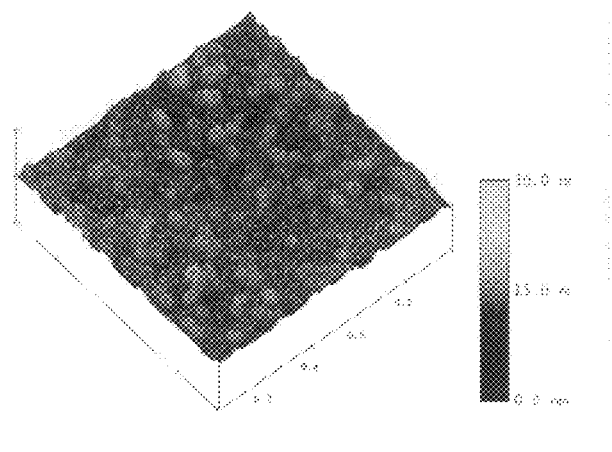

The SiO$_2$ coated sample prepared according to Example 18 was placed in a reactor and heated to 473 K at 3 K/min. The polymer template was removed by 250 sccm of 100 g/m$^3$ O$_3$ in O$_2$ gas mixture at 473 K for 5 to 6 h. The sample was cooled to room temperature and removed for analysis. The sample was imaged using AFM. The obtained SiO$_2$ nanotextured surface that consists of nano-bottle features was shown in FIGS. 19(*a*) and (*b*). XPS analysis of the sample indicated a uniform SiO$_2$ surface coverage. For comparison, the surface feature of a similarly prepared SiO$_2$ film spin-coated on silicon for comparison was shown in FIGS. 19(*c*) and (*d*). It made clear that the nano-bottles are the result of the preparation procedure according to the present subject matter.

Example 22

Preparation of SiO$_2$ Nano-Bottles with Thicker Shell

Using the same method as described in Example 21, except for the use of a thicker layer of SiO$_2$ coated sample which was prepared by spin-coating 0.25 mol/L SiO$_2$ sol onto the silicon wafer with PMMA nanotexture at a 6000 rpm, SiO$_2$ nanotextured surface that consists of nano-bottles with thicker shell was prepared as shown FIGS. 20 (*a*) and (*b*). The SiO$_2$ shell was thicker as the spin-coated SiO$_2$ layer was thicker. XPS analysis of the sample indicated a uniform SiO$_2$ surface coverage.

Example 23

Preparation of SiO$_2$ Nano-Bottles with Thicker Shell 0.25 mol/L SiO$_2$ sol was spin-coated on a silicon surface with PMMA nanotexture at a 6000 rpm (Speciality Coating System, Inc., Model, P-6204). After spin-coating the sample was outgassed at room temperature to remove the solvent. The SiO$_2$ coated sample was placed in a furnace and calcined in air at 723 K for 10 h. The sample was cooled to room temperature and removed for analysis. The sample was imaged using AFM. FIGS. 21 (*a*) and (*b*) show the obtained SiO$_2$ nanotextured surface that consists of nano-bottles with thicker shell. The SiO$_2$ shell was thicker as the spin-coated SiO$_2$ layer was thicker. XPS analysis of the sample indicated a uniform SiO$_2$ surface coverage.

Example 24

Preparation of SiO$_2$ Nano-Bowls

A 0.25 mol/L SiO$_2$ sol was spin-coated on a silicon surface with PMMA nanotexture at a 6000 rpm (Speciality Coating System, Inc., Model, P-6204). After spin-coating the sample was outgassed at room temperature to remove the solvent. The SiO$_2$ coated sample was placed in a furnace and calcined in air at 823 K for 10 h. The sample was cooled to room temperature and removed for analysis. The resulting SiO$_2$ nano-bottles were transformed into nano-bowls by etching in 10 wt. % KOH solution for 90 minutes and 170 minutes. The sample was imaged using AFM. SiO$_2$ nano-bottles with a bottle mouth of 16 nm were shown in FIG. 21. SiO$_2$ nano-bowls with a mouth of 34 nm obtained under etching time 90 minutes was shown in FIG. 22. SiO$_2$ nano-bowls with a mouth of 87 nm obtained under etching time of 170 minutes was shown in FIG. 23. XPS analysis of the sample indicated a uniform SiO$_2$ surface coverage.

Example 25

Preparation of TiO$_2$ Nano-Rings (Nano-Corrals)

Figure 24:
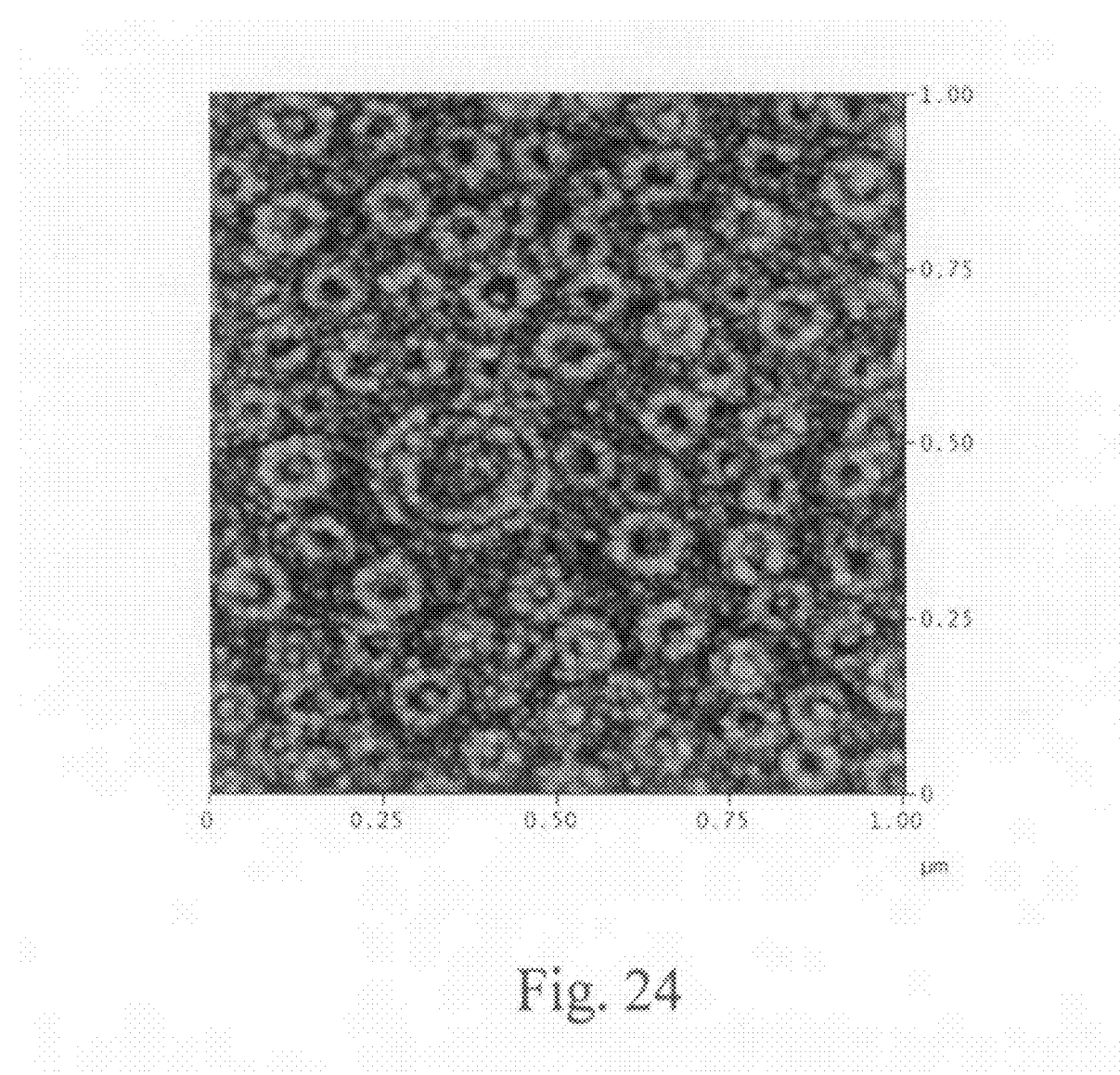
FIG. 24 shows TiO$_2$ nano-ring feature after oxygen plasma treatment according to one embodiment of the present subject matter.

A 0.05 mol/L TiO$_2$ sol was spin-coated on a silicon surface with PMMA nanotexture at a 6000 rpm (Speciality Coating System, Inc., Model, P-6204). After spin-coating the sample was outgassed at room temperature to remove the solvent. The TiO$_2$ coated sample was treated under oxygen plasma at 473 K for 30 minutes. The sample was imaged using AFM. The obtained TiO$_2$ nanotextured surface that consists of nano-ring features made of fused TiO$_2$ nanoparticles was shown in FIG. 24. XPS analysis of the sample indicated a uniform TiO$_2$ surface coverage.

Example 26

Preparation of TiO$_2$ Film with Nano-Holes

A 0.05 mol/L TiO$_2$ sol was spin-coated on a silicon surface with PMMA nanotexture at a 6000 rpm (Speciality Coating System, Inc., Model, P-6204). After spin-coating the sample was outgassed at room temperature to remove the solvent. The TiO$_2$ coated sample was placed in the furnace and calcined in air at 933 K for 10 h. The obtained TiO$_2$ film with nano-holes was shown in FIGS. 25(*a*) and (*b*). For comparison, a similarly prepared comparative TiO$_2$ film was shown in FIGS. 25(*c*) and (*d*). XPS analysis of the sample indicated a uniform TiO$_2$ surface coverage.

Example 27

Preparation of Silicon Etched with Regular Nano-Holes

A 0.25 mol/L SiO$_2$ sol was spin-coated on a silicon surface with PMMA nanotexture at a 6000 rpm (Speciality Coating System, Inc., Model, P-6204). After spin-coating the sample was outgassed at room temperature to remove the solvent. The SiO$_2$ coated sample was placed in the furnace and calcined in air at 823 K for 10 h to obtain SiO$_2$ nano-bottles. The sample was etched in two steps with 10 wt. % and 20 wt. % KOH solutions to first enlarge the opening mouth of the nano-bottles and etch the silicon beneath. The sample was imaged using AFM. FIG. 26 showed a silicon sample uniformly etched with 20 nm holes.

Example 28

Test for Self-Cleaning, Germicidal Surface Coating 0.20 M $TiO_2$ sol was coated on a glass surface and calcined in air at 773 K for 10 h. 30 μl of 30 mg/ml SBS/toluene was spin-coated on the $TiO_2$ coated glass and irradiated with microwave under hydrothermal conditions. X-ray diffraction and micro-Raman analyses were carried out and the results indicated that the $TiO_2$ coated on the glass is anatase with 10 nm particle size. Anatase $TiO_2$ possesses latent germicidal property that is enhanced upon exposure to UV light source (i.e., sunlight or UV lamp). Wetting angle measurements were conducted using water. As shown in FIG. 29 and FIG. 30, in the $TiO_2$ coated surface coated with nanotextured SBS, the contact angle of the water droplet was increased to ~100° making the surface hydrophobic and to >100° making the surface superhydrophobic, respectively. It was compared with a well known superhydrophilic $TiO_2$ thin film as shown in FIG. 28 for comparison.

Example 29

Immobilization of Biomolecules in $SiO_2$ Nano-Bowls $SiO_2$ nano-bowls were prepared according to the procedure described in Example 23 with the etching time adjusted to 30 minutes. The sample was incubated in 1 mg/ml fluorescent isothiocyanate labeled bovine serum albumin (BSA-FITC, Sigma) for 40 minutes before rinsing in a phosphate buffered solution for 30 minutes. The immobilized BSA-FITC was imaged by a fluorescent microscope (BX41, Olympus) at an excitation wavelength of 400-490 nm. The pictures were taken at 40× magnification with an exposure time of 2000 ms with the shutter fully open. The increase fluorescent signal seen in FIG. 31 for BSA-FITC immobilized on $SiO_2$ nano-bowls indicated the successfully immobilization of the BSA biomolecules in contrast to that of the non-textured surface.

We claim:

1. A method for creating a nanotextured surface, comprising (a) depositing a polymer film on a substrate; and (b) transforming the polymer film into uniform islands of a regularly shaped, nanometer sized template solely by a microwave-assisted hydro- or solvo-thermal treatment.

2. A method for creating a nanotextured surface, which comprises
   (a) depositing a polymer film on a substrate;
   (b) transforming the polymer film into uniform islands of a regularly shaped, nanometer sized template solely by a microwave-assisted hydro- or solvo-thermal treatment;
   (c) depositing at least one other material onto the template.

3. The method of claim 2, which further comprises removing the polymer template to create regularly shaped, hollow nanostructures.

4. The method of claim 1, wherein the polymer film is selected from the group consisting of thermoplastic polymers, block polymers, resin and photoresists.

5. The method of claim 1, wherein the polymer film is selected from the group consisting of Polymethyl methacrylate (PMMA), polystyrene-polybutadiene-polystyrene (SBS) and SU-8.

6. The method of claim 1, wherein the hydro- or solvo-thermal treatment includes solvents selected from the group consisting of water, alcohol, ketone and mixture thereof.

7. The method of claim 2, wherein the at least one other material is selected from the group consisting of molecules, clusters and articles of metal, metal oxides, semiconductors, polymers and inorganic materials.

8. The method of claim 2, wherein the said deposition of the at least one other material results in a thin coating layer of about 3 nm to about 7 nm.

9. The method of claim 8, wherein the coating layer is a thin coating layer of $SiO_2$ or $TiO_2$.

10. The method of claim 9, wherein the SiO2 or TiO2 is coated onto the polymer template wherein the polymer template is made from PMMA.

11. The method of claim 1, wherein the islands have a size from about 10 nm to about 200 nm.

12. The method of claim 3, wherein the regularly shaped, hollow nanostructures are any of nano-bottles, nano-bowls, nano-rings and nano-holes.

13. The method of claim 12, wherein the regularly shaped, hollow nanostructures are nano-bottles.

14. The method of claim 13, wherein the nano-bottles are $SiO_2$ or $TiO_2$ nano-bottles.

15. The method of claim 14, wherein the nano-bottles are prepared by removing the polymer template by ozone oxidation.

16. The method of claim 13, wherein the nano-bottles are further etched to obtain nano-bowls.

17. The method of claim 16, wherein the nano-bowls are $SiO_2$ or $TiO_2$ nano-bowls.

18. The method of claim 12, wherein the regularly shaped, hollow nanostructures are nano-rings.

19. The method of claim 12, wherein the nano-rings are prepared by removing the polymer template by oxygen plasma.

20. The method of claim 12, wherein the nano-holes are prepared by removing the polymer template by air carcination.

* * * * *